(12) United States Patent
Kakde et al.

(10) Patent No.: US 8,671,364 B2
(45) Date of Patent: Mar. 11, 2014

(54) TECHNIQUES TO PRESENT HIERARCHICAL INFORMATION USING A MULTIVARIABLE DECOMPOSITION VISUALIZATION

(75) Inventors: Deovrat Vijay Kakde, Pune (IN); Arindam Chakrabarti, Pune (IN)

(73) Assignee: SAS Institute, Inc., Cary, NC (US)

( * ) Notice: Subject to any disclaimer, the term of this patent is extended or adjusted under 35 U.S.C. 154(b) by 262 days.

(21) Appl. No.: 13/245,550

(22) Filed: Sep. 26, 2011

(65) Prior Publication Data
US 2013/0080978 A1 Mar. 28, 2013

(51) Int. Cl.
*G06F 3/00* (2006.01)

(52) U.S. Cl.
USPC .......................... 715/854; 715/853; 715/765

(58) Field of Classification Search
USPC ..................... 715/700, 764, 765, 853, 854
See application file for complete search history.

(56) References Cited

U.S. PATENT DOCUMENTS

| | | | | |
|---|---|---|---|---|
| 6,259,451 | B1 * | 7/2001 | Tesler | 345/419 |
| 2002/0070953 | A1 * | 6/2002 | Barg et al. | 345/700 |
| 2007/0252834 | A1 * | 11/2007 | Fay | 345/428 |

OTHER PUBLICATIONS

Graham, Martin et al., "A Survey of Multiple Tree Visualisation", School of Computing, Napier University, Dec. 2008, 28 pages.
Freeman, Linton C., "Displaying Hierarchical Clusters", Connections 17(2), 1994, 9 pages.
Friendly, Michael, "A Brief History of the Mosaic Display", Sep. 25, 2001, 17 pages.
"Sankey Diagrams", retrieved from the internet on Mar. 14, 2011, 12 pages. http://www.sankey-diagrams.com/page/2/.
Wattenberg, Maritin, "Visual Exploration of Multivariate Graphs", Visual Communication Lab, IBM Research, 2006, 9 pages.
Theus, Martin et al., "Visualizing Loglinear Models", Journal of Computational and Graphical Statistics, vol. 8, No. 3, 1999, pp. 396-412.
Few, Stephen, "An Introduction to Visual Multivariate Analysis", Perceptual Edge, Jul. 11, 2006, 8 pages.

* cited by examiner

*Primary Examiner* — Xiomar L Bautista
(74) *Attorney, Agent, or Firm* — Kacvinsky Daisak Bluni PLLC

(57) ABSTRACT

Techniques to present hierarchical information as orthographic projections are described. An apparatus may comprise an orthographic projection application arranged to manage a three dimensional orthographic projection of hierarchical information. The orthographic projection application may comprise a hierarchical information component operative to receive hierarchical information representing multiple nodes at different hierarchical levels, and parse the hierarchical information into a tree data structure, an orthographic generator component operative to generate a graphical tile for each node, arrange graphical tiles for each hierarchical level into graphical layers, and arrange the graphical layers in a vertical stack, and an orthographic presentation component operative to present a three dimensional orthographic projection of the hierarchical information with the stack of graphical layers each having multiple graphical tiles. Other embodiments are described and claimed.

41 Claims, 20 Drawing Sheets

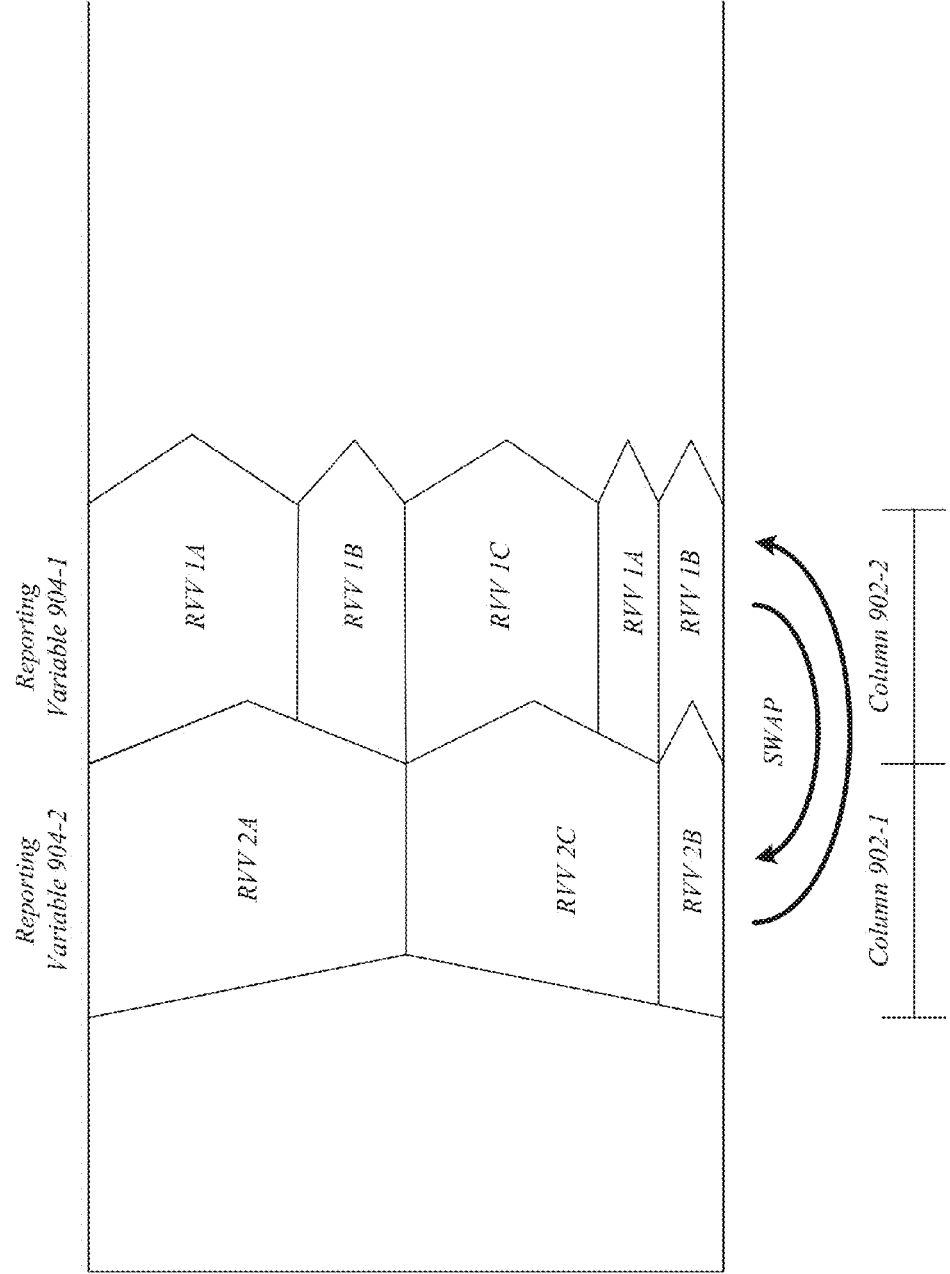

1000

GENERATE A MULTIVARIABLE DECOMPOSITION VISUALIZATION TO PRESENT HIERARCHICAL INFORMATION FOR A RESPONSE VARIABLE AND MULTIPLE REPORTING VARIABLES DEFINED FOR THE RESPONSE VARIABLE IN A SINGLE USER INTERFACE VIEW, THE MULTIVARIABLE DECOMPOSITION VISUALIZATION COMPRISING MULTIPLE GRAPHICAL USER INTERFACE (GUI) ELEMENTS EACH REPRESENTING A REPORTING VARIABLE VALUE OF MULTIPLE REPORTING VARIABLES FOR MULTIPLE HIERARCHICAL LEVELS, WITH A GUI ELEMENT OF A REPORTING VARIABLE VALUE OF A REPORTING VARIABLE OF A HIERARCHICAL LEVEL SELECTABLE FOR DECOMPOSITION INTO MULTIPLE GUI ELEMENTS REPRESENTING REPORTING VARIABLE VALUES OF A DIFFERENT REPORTING VARIABLE FOR A DIFFERENT HIERARCHICAL LEVEL
*1002*

RECEIVE A CONTROL DIRECTIVE INDICATING SELECTION OF THE SELECTABLE GUI ELEMENT OF THE HIERARCHICAL LEVEL FOR DECOMPOSITION INTO DECOMPOSED GUI ELEMENTS OF THE DIFFERENT HIERARCHICAL LEVEL
*1004*

PRESENT THE SELECTABLE GUI ELEMENT OF THE HIERARCHICAL LEVEL ADJACENT TO THE DECOMPOSED GUI ELEMENTS OF THE DIFFERENT HIERARCHICAL LEVEL IN RESPONSE TO THE CONTROL DIRECTIVE
*1006*

*FIG. 10*

TECHNIQUES TO PRESENT HIERARCHICAL INFORMATION USING A MULTIVARIABLE DECOMPOSITION VISUALIZATION

BACKGROUND

Information is growing at an accelerating rate. Computer-based information systems are continually innovating in order to manage, organize and present these growing volumes of information. A decision support system (DSS) is an example of a type of information system that supports business or organizational decision-making activities. Information systems such as a DSS manage information assets, such as legacy and relational data sources, data cubes, data warehouses, data marts, and so forth. Despite improvements in managing information assets, however, presentation techniques for information are still based on conventional graphical user interface (GUI) charting techniques. Conventional GUI charting techniques are insufficient to present, navigate and interact with ever-increasing data sets managed by modern information systems. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage, present, navigate, and interact with hierarchical information. Some embodiments are particularly directed to techniques to present hierarchical information using a multivariable decomposition visualization.

In one embodiment, for example, an apparatus may comprise an information visualization application operative on a logic device. The information visualization application may comprise a multivariable presentation component arranged to generate a multivariable decomposition visualization to present hierarchical information for a response variable and multiple reporting variables defined for the response variable in a single user interface view. The multivariable decomposition visualization may comprise multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level. The selectable GUI element of the hierarchical level may be positioned adjacent to, or adjoining with, the decomposed GUI elements of the different hierarchical level when the selectable GUI element is selected for decomposition. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9B illustrates an embodiment of a fourteenth GUI view of a hierarchical decomposition visualization.

FIG. 10 illustrates an embodiment of a logic flow.

DETAILED DESCRIPTION

Figure 1:
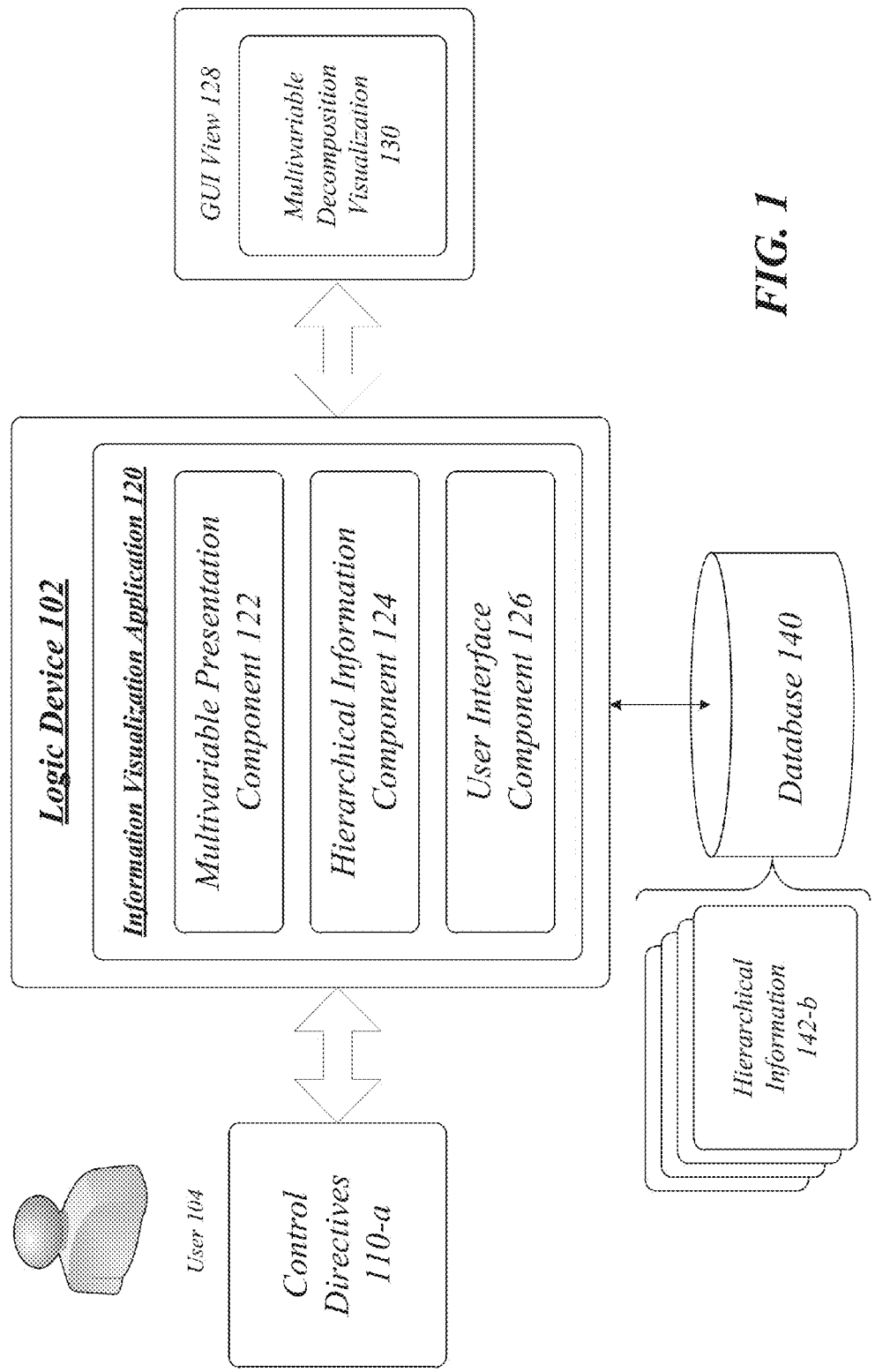
FIG. 1 illustrates an embodiment of an information visualization system.

Various embodiments are generally directed to techniques for improving graphical representation of data. Some embodiments are particularly directed to techniques for generating a unique visual graphical representation suitable for presenting, navigating, and managing larger volumes of information. As a result, a user can analyze large quantities of data in a more efficient and effective manner.

In one embodiment, techniques may be used to generate a multivariable decomposition visualization. A multivariable decomposition visualization may comprise a visual graphical representation of hierarchical information with multiple reporting variables. The reporting variables can be decomposed (or exposed) in accordance with a customizable hierarchy, thereby allowing a user to more easily visualize and investigate particular information of interest with varying levels of granularity.

In many analysis scenarios, a user needs to visualize data which has one response variable (continuous) and multiple reporting variables (discrete). The reporting variables are often hierarchical in nature. Prevalent usage involves use of multiple sets of charts, such as bar charts or line charts, for visualization of such data. Typically, a knowledge discovery process starts with one chart and then each element of the chart can be split into multiple charts with respect to other reporting variables in the hierarchy. If a data analysis project involves this type of visualization, there are several disadvantages associated with it. For instance, visualizing data in a series of charts leads to loss of compactness, which is often a factor in smaller displays. Further, information context may be lost when navigating between charts to view data from different hierarchies. In addition, direct comparison of information from different charts may be difficult since a scale may change between the different charts. These and other disadvantages associated with using multiple different charts for a single set of hierarchical information increases complexity of information analysis. For instance, performing a root cause analysis to detect where exactly a problem is located with respect to combinations of different reporting variable values is extremely difficult when a user needs to mentally correlate information from different charts. The presence of different scales in each of these charts further exacerbates this problem.

A more particular example of the limitations of conventional solutions may be demonstrated by examining a typical "drill-to" technique used in the information analytics or business intelligence industry for performing root cause analysis. A Drill-to technique refers to a process of running a subsequent child analysis based on certain selections on the current parent analysis output. This may be a traditional hierarchy implying containment of a child level into a parent level, such as {Year→Month→Day}. This could also be a logical user-defined hierarchy defined for ease of analysis, representing a user path of knowledge discovery, such as {car engine-size (defined by number of cylinders)→car-model→car make-year}. In most cases, the drill-to technique from a parent analysis involves creation of multiple child analyses. For example, first a bar chart is plotted from the parent data. Then one of the bars from the bar chart is drilled. Each drilling action results in creation of a separate chart. Assume the parent chart is in level-1, and a next set of charts are in level-2. For further drill-to operations, again from the level-2 charts, a set of new charts is created which is part of a new level-3. This process can continue for the entire hierarchy. The presence of separate charts causes a loss in compactness of the analysis, since the discovered knowledge is scattered among different charts. Further, separate charts create a significant amount of clutter and can act as an overhead to user cognition. In addition, a totality and percentage (%) of the total is not shown in a single bar chart. Any contribution of a bar chart to its ancestors is lost. Finally, each separate chart can handle only two reporting variables. A chart with more reporting variables is not possible using this technique.

To solve these and other problems, embodiments implement a new type of visual graphical representation, referred to as a multivariable decomposition visualization. A multivariable decomposition visualization is a visual graphical representation, such as a chart, that can be used to uniquely visualize large hierarchical data sets. A multivariable decomposition visualization provides factual insights which can help in quick identification of root causes of a problem under investigation. A multivariable decomposition visualization solves the multi-chart, scale mismatch and clutter problem encountered when causes are analyzed one at a time. A multivariable decomposition visualization also provides a single compact visualization that retains information context and facilitates data interpretation. Along with the novel visualization techniques, a multivariable decomposition visualization may offer innovative interactive features, such as swapping, aggregation and "setting as root," to assist in exploring large hierarchical data sets in a robust manner.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for an information visualization system 100. The information visualization system 100 may be generally arranged to manage different types of information, including hierarchical information and non-hierarchical information having some form of defined relationships or order. The information visualization system 100 may be particularly arranged to handle large volumes of hierarchical information typically not suitable for traditional graphical visualization and analysis, such as through charts, graphs or tables. In one embodiment, for example, the information visualization system 100 may be implemented as DSS designed to handle massive amounts of centralized or distributed information for a given business, enterprise or organization across multiple entities, products, services and geographies. A DSS may comprise a computer-based information system that supports decision-making activities for a business or organization.

The information visualization system 100 may have one or more software applications and/or software components. In the illustrated embodiment shown in FIG. 1, the information visualization system 100 comprises an information visualization application 120. The information visualization application 120 comprises a multivariable presentation component 122, a hierarchical information component 124, and a user interface component 126. Although the information visualization system 100 shown in FIG. 1 has a limited number of elements in a certain topology, it may be appreciated that the information visualization system 100 may include more or less elements in alternate topologies as desired for a given implementation. The embodiments are not limited in this context.

The information visualization application 120 may generally comprise an application program specifically designed to present graphical representations for hierarchical or non-hierarchical information. In various implementations, the information visualization application 120 may provide a graphical user interface (GUI), either natively or via the user interface component 126, to communicate information between the information visualization application 120 and an output device (e.g., an electronic display) suitable for presenting information to a user 104. The information visualization application 120 may comprise a stand-alone application program, or may be an integrated part of another application program. An application program is any software program that generally allows a user to accomplish one or more specific tasks. Examples of application programs may include without limitation information technology (IT) management applications, human resource management applications, financial management applications, business intelligence applications, customer relationship management applications, report generating applications, statistical analysis applications, business planning applications, project management applications, productivity applications, word processing applications, spreadsheet applications, database applications, and so forth. In one embodiment, for example, the information visualization application 120 may be implemented as part of one or more SAS® software application programs made by SAS Institute Inc., Cary, N.C., such as SAS/Graph, Base SAS Software, SAS/Management Console, SAS Enterprise Business Intelligence Server, SAS Enterprise Miner, SAS Information Map Studio, SAS Web Report Studio, Business Intelligence (BI) Dashboard, SAS Financial Management, SAS Spectraview, SAS Activity Based Management, and so forth. The embodiments, however, are not limited to these examples.

The information visualization application 120 may comprise a multivariable presentation component 122. The multivariable presentation component 122 may be arranged to generate a multivariable decomposition visualization 130 to present hierarchical information 142-b for a response variable and multiple reporting variables defined for the response variable in a single graphical user interface (GUI) view 128. A user 104 may manipulate the multivariable decomposition visualization 130 via one or more human input devices arranged to generate and send control directives 110-a in response to user commands from the user 104.

It is worthy to note that "a" and "b" and "c" and similar designators as used herein are intended to be variables representing any positive integer. Thus, for example, if an implementation sets a value for a=5, then a complete set of control directives 110-a may include control directives 110-1, 110-2, 110-3, 110-4 and 110-5. The embodiments are not limited in this context.

The information visualization a pplication 120 may also comprise a hierarchical information component 124. The hierarchical information component 124 may generally manage various sets of hierarchical information 142-b stored by the database 140. For instance, the hierarchical information component 124 may process hierarchical information 142-b in order to prepare the hierarchical information 142-b for use by the multivariable presentation component 122. For example, the hierarchical information component 124 may be operative to retrieve hierarchical information 142-b stored in a database 140, or receive hierarchical information 142-b from a remote data source. The hierarchical information 142-b may represent multiple nodes at different hierarchical levels. The hierarchical information component 124 may parse the hierarchical information 142-b into a tree structure.

Hierarchical information 142-b may refer to any information organized into some form of a hierarchy. A hierarchy is an ordered set or an acyclic graph. A hierarchy may comprise an arrangement of items in which the items are represented as being above, below or at a same level as one another. A classic example of hierarchical information 142-b is a tree structure, although others exist as well.

In one embodiment, the hierarchical information 142-b may comprise a tree structure of nodes comprising a root node, interior nodes and leaf nodes. A tree structure is an acyclic connected graph of nodes. A node is a structure which may contain a value, a condition, or represent a separate data structure, which could be a tree structure of its own. A node may have zero or more children nodes and at most one parent node. Furthermore, the children of each node have a specific order. A topmost node in a tree is called a root node. A node that has one or more child nodes is called an interior node. A node that does not have any child nodes is called a leaf node.

The hierarchical information component 124 may receive hierarchical information 142-b representing multiple nodes at different hierarchical levels, and parse the hierarchical information 142-b into a tree structure. A hierarchical level of the hierarchical information 142-b may comprise, for example, a set of nodes having a same distance from a root node. The hierarchical information component 124 may receive the hierarchical information 142-b, such as from a local datastore (e.g., database 140) or a remote datastore, and parse the hierarchical information 142-b into a tree data structure having a data schema suitable for use by the information visualization application 120. To the extent that the hierarchical information 142-b and the information visualization application 120 use different data schemas, one or more custom translation components (not shown) may be used to translate the hierarchical information 142-b from a native data schema to one used by the information visualization application 120.

In one embodiment, the information visualization application 120 may comprise a user interface component 126. The user interface component 126 may generate various GUI views, such as the GUI view 128. In one embodiment, the user interface component 126 may comprise part of the information visualization application 120. In one embodiment, the user interface component 126 may comprise part of another software application, such as an operating system (OS) for the information visualization application 120.

Figure 2:
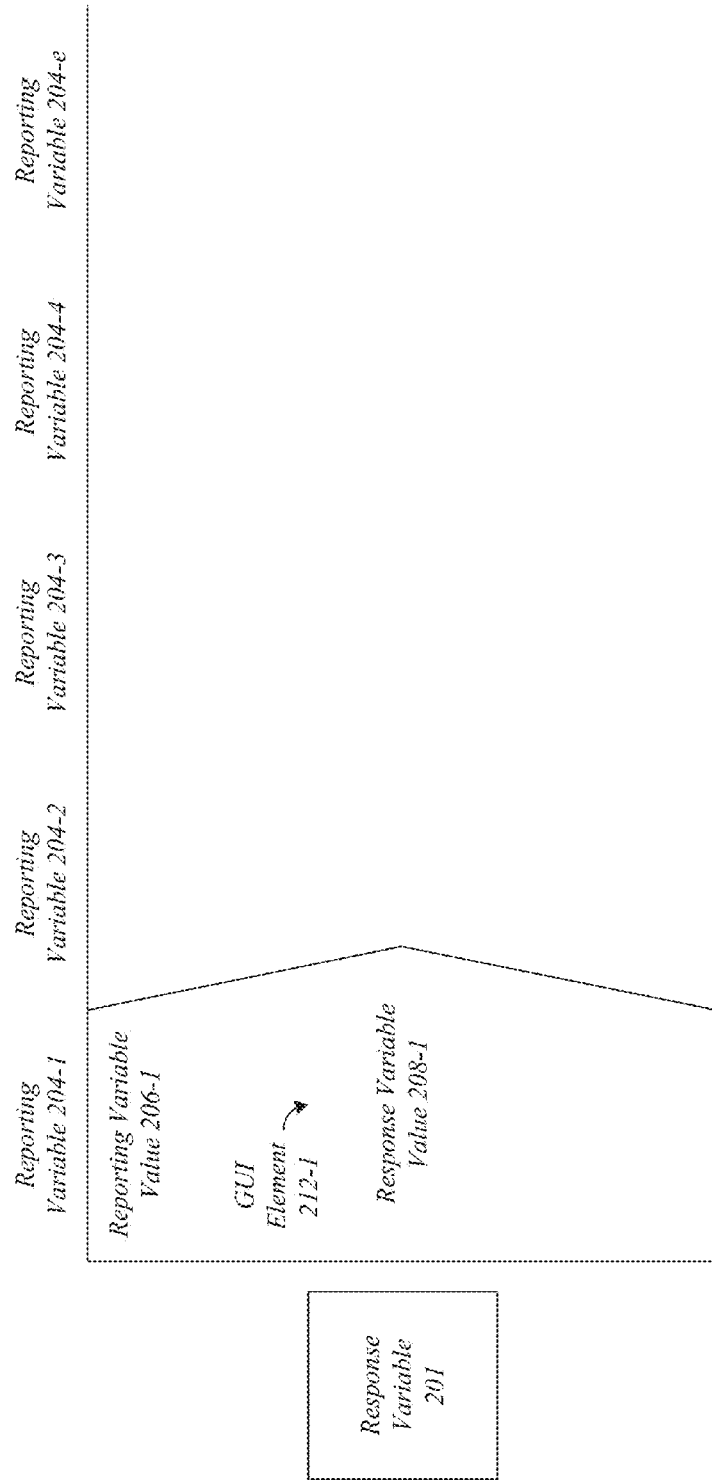
FIG. 2 illustrates an embodiment of a first GUI view of a hierarchical decomposition visualization.

FIG. 2 illustrates an exemplary implementation of a multivariable decomposition visualization 130 generated by the multivariable presentation component 122 and presented in a GUI view 128 generated by the user interface component 126 showing a root hierarchical level 210-1 before any decomposition operations have been performed.

In the illustrated embodiment shown in FIG. 2, a multivariable decomposition visualization 130 may comprise a single response variable 201 and multiple reporting variables 204-e. A response variable 201 may comprise, for example, a dependent variable representing values that change as a result of changes in an independent variable. A response variable 201 may comprise any variable that the user 104 would be interested in predicting or forecasting. As such, a response variable 201 is sometimes referred to as a predicted variable. A reporting variable 204-e may comprise, for example, any independent variable that is manipulated or changed to produce resulting changes in a dependent variable, such as the response variable 201. A reporting variable 204-e may be any variable that predicts or explains a response variable 201. As such, a reporting variable 204-e is sometimes referred to as a predictor variable or explanatory variable. By way of example and not limitation, assume a response variable 201 for the multivariable decomposition visualization 130 shown in FIG. 2 is a number of cars, and the reporting variables 204-e each represent different categories for cars, such as a car manufacturer, a car make, a car model, a car year, a car engine size, a country, and so forth.

The multivariable presentation component 122 may generate a multivariable decomposition visualization 130 with multiple columns 202-c, with each column 202-c to present one or more GUI elements 212-f for each reporting variable value 206-g of a reporting variable 204-e of a given hierarchical level 210-d.

The multivariable decomposition visualization 130 may have multiple columns 202-c, with each column 202-c representing a hierarchical level 210-d for a given set of hierarchical information 142-b. Further, each column 202-c may have one or more GUI elements 212-f, an example of which is shown as GUI element 212-1 in column 202-1 of FIG. 2. The GUI elements 212-f may comprise different visual graphical representations of an object. The GUI elements 212-f may have different visual properties, such as colors, shapes, sizes or geometries, depending on what type of information the GUI elements 212-f are representing. For instance, different hierarchical levels 210-d may have different colors, and GUI elements 212-f within a given column 202-c of a hierarchical level 210-d may have a same or similar color as assigned to the hierarchical level 210-d. In the example shown in FIG. 2, the GUI element 212-f has a general shape of an arrow, indicating a direction or vector for presenting decomposed information. It may be appreciated, however, that different shapes may be used as well. The embodiments are not limited in this context.

A GUI element 212-f may comprise or present a reporting variable value 206-g for a corresponding reporting variable 204-e of a hierarchical level 210-d. A reporting variable value 206-g may comprise a value for a reporting variable 204-e. For instance, assume a reporting variable 204-1 comprises a root node for a hierarchical level 210-1. In this case, a reporting variable value 206-1 will be set to a default value, such as zero (0), representing the root category.

A GUI element 212-f may also comprise or present a response variable value 208-h for a corresponding reporting variable value 206-g of a hierarchical level 210-d. A response variable value 208-h may comprise a value for the response variable 201. For instance, assume a reporting variable 204-1 comprises a root node for a hierarchical level 210-1. In this case, a response variable value 208-1 will be set to a total number of items in a set of hierarchical information 142-b. For instance, assume that a set of hierarchical information 142-b comprises information about a total number of cars sold in North America, including the United States of America (USA) and Canada. In this case, a response variable value 208-1 may be set to a total number of cars (100%) in the entire set of hierarchical information 142-b, which in this example may comprise a total number of cars (e.g., 2537 cars sold in North America).

Figure 3A:
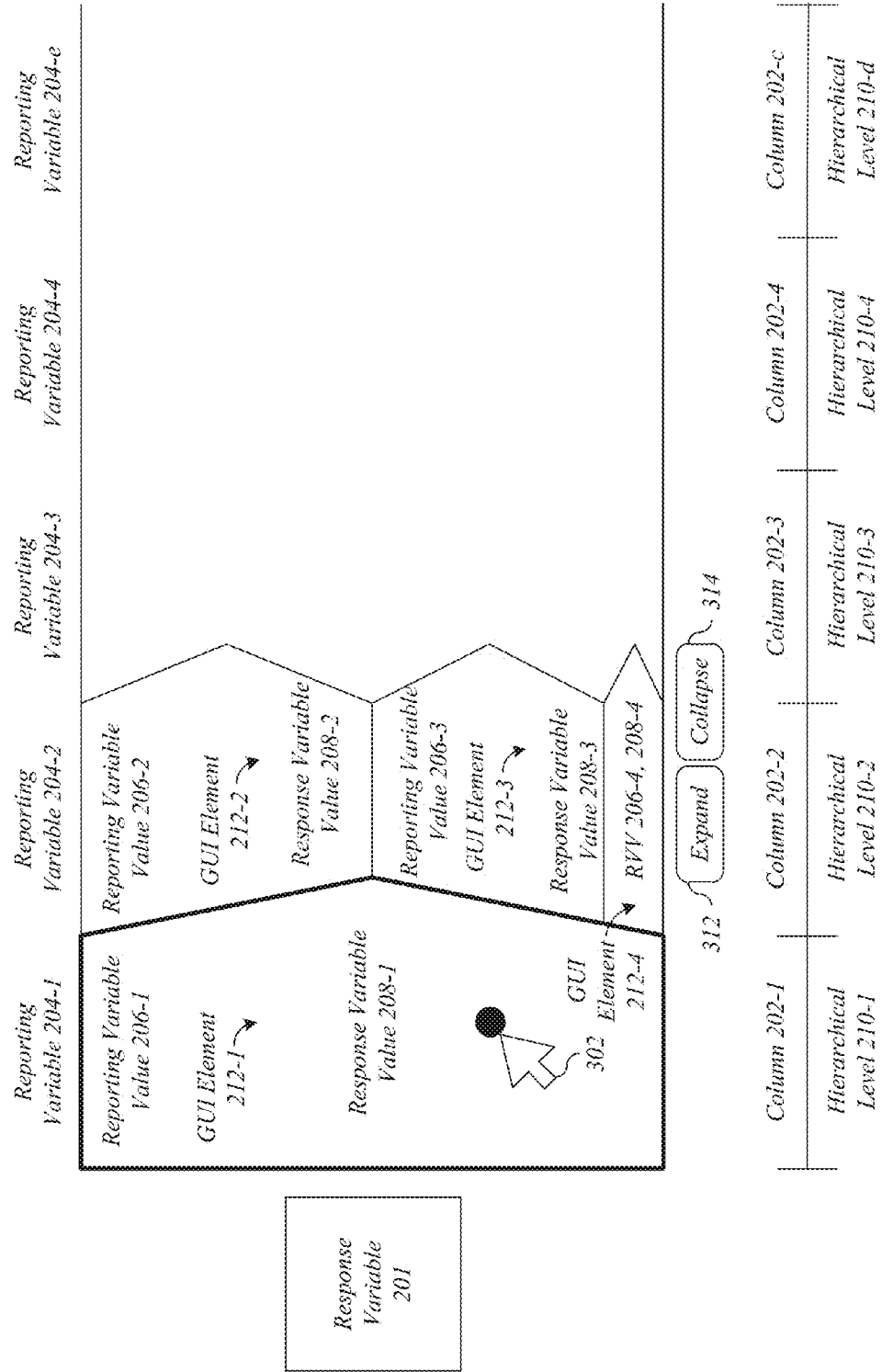
FIG. 3A illustrates an embodiment of a second GUI view of a hierarchical decomposition visualization.

FIG. 3A illustrates an exemplary implementation of a multivariable decomposition visualization 130 generated by the multivariable presentation component 122 and presented in a GUI view 128 generated by the user interface component 126 showing a root hierarchical level 210-1 and a decomposed hierarchical level 210-2 after a first set of decomposition operations are performed.

A given column 202-c of the multivariable decomposition visualization 130 may be selectable for decomposition into a set of constituent parts for a hierarchical level below the given column 202-c. In various embodiments, the multivariable presentation component 122 may receive a control directive 110-a selecting a selectable GUI element 212-f of a hierarchical level 210-d for decomposition into decomposed GUI elements 212-f of a different hierarchical level 210-d. As shown in FIG. 3A, for example, the multivariable presentation component 122 may receive a control directive 110-1 selecting a selectable GUI element 212-1 of a hierarchical level 210-1 for decomposition into decomposed GUI elements 212-2, 212-3, 212-4 of a different hierarchical level 210-2. The user 104 may select the GUI element 212-1 using a pointing device 302 (e.g., a human input device) controlled by the user 104. FIG. 3A illustrates the GUI element 212-1 after selection with bold borders around the selected GUI element 212-1.

More particularly, the multivariable decomposition visualization 130 may include a GUI element 212-f of a reporting variable value 206-g of a reporting variable 204-e of a hierarchical level 210-d selectable for decomposition into multiple GUI elements 212-f representing reporting variable values 206-g of a different reporting variable 204-e for a different hierarchical level 210-d. As shown in FIG. 3A, for example, the multivariable decomposition visualization 130 may include a GUI element 212-1 of a reporting variable value 206-1 of a reporting variable 204-1 of a hierarchical level 210-1 selectable for decomposition into multiple GUI elements 212-2, 212-3, 212-4 representing reporting variable values 206-2, 206-3, 206-4, respectively, of a different reporting variable 204-2 for a different hierarchical level 210-2. The selectable GUI element 212-1 of the hierarchical level 210-1 may be positioned proximate to the decomposed GUI elements 212-2, 212-3, 212-4 of the different hierarchical level 210-2 when the selectable GUI element 212-1 is selected for decomposition.

Continuing with our previous car example, assume the reporting variable 204-2 represents a year a car was manufactured. In this case, the reporting variable values 206-2, 206-3 and 206-4 may represent different car years, such as 1996, 1997 and 1998, respectively. The response variable values 208-2, 208-3 and 208-4 may represent a number of cars made in each year, such as 1306, 945, and 286, respectively. It is worthy to note that a total sum of 1306+945+286=2537 cars as represented by the root hierarchical level 210-1.

In addition to showing the decomposed GUI elements 212-2, 212-3, 212-4 of the different hierarchical level 210-2 after selection of the GUI element 212-1, the multivariable decomposition visualization 130 may also present various GUI control elements 312, 314 for the column 202-2 of the hierarchical level 210-2. In this case, the GUI control element 312 may control expansion of the column 202-2, and the GUI control element 314 may control collapse of the column 202-2. This provides column level controls for the multivariable decomposition visualization 130.

Figure 3B:
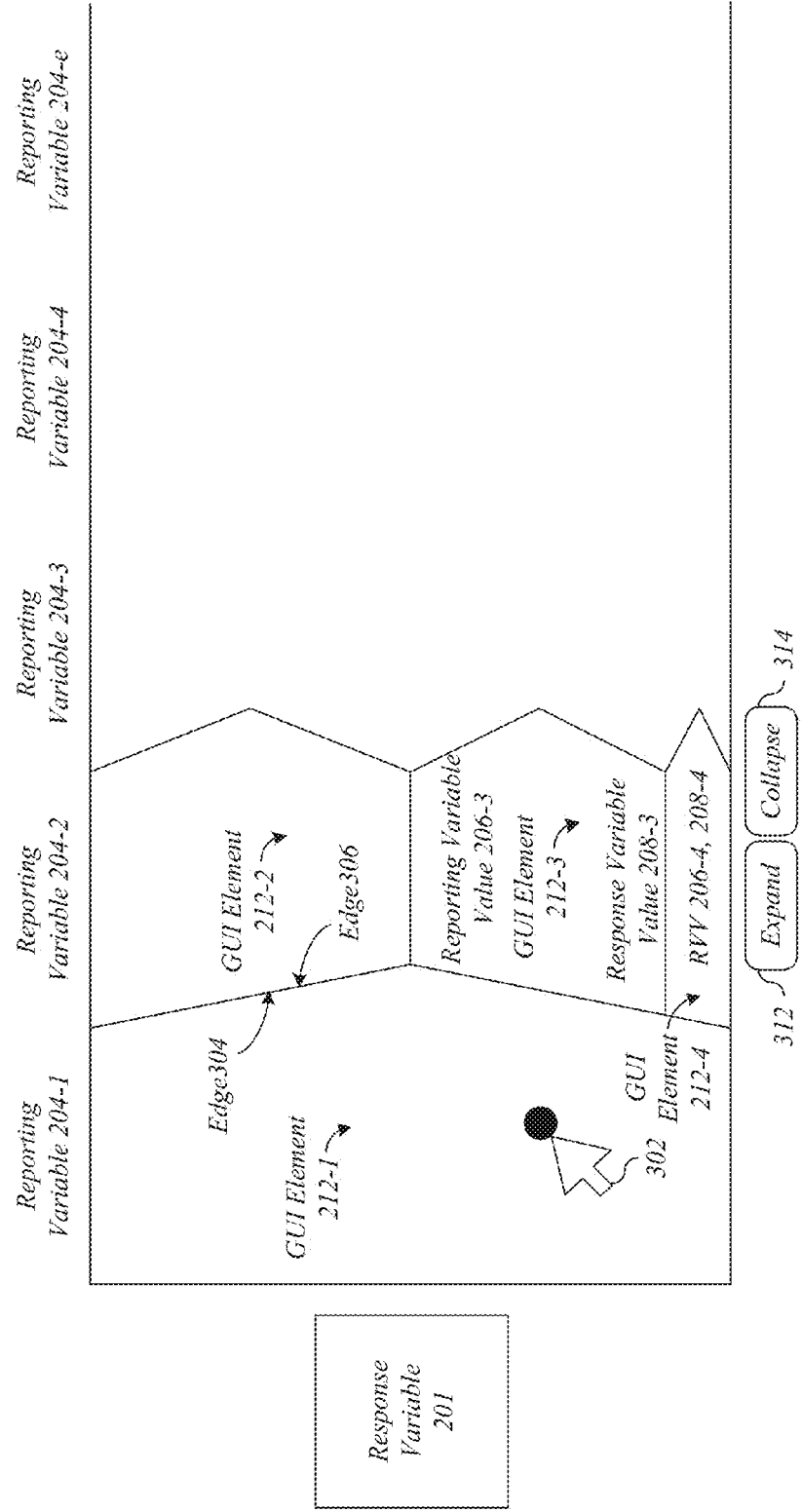
FIG. 3B illustrates an embodiment of a third GUI view of a hierarchical decomposition visualization.

FIG. 3B illustrates an exemplary implementation of a multivariable decomposition visualization 130 generated by the multivariable presentation component 122 and presented in a GUI view 128 generated by the user interface component 126 after decomposition with adjoining edges for the GUI elements 212-1, 212-2, 212-3 and 212-4.

After a selectable GUI element 212-f has been selected via the pointing device 302, one or more decomposed GUI elements 212-f may surface or appear in the multivariable decomposition visualization 130 proximate to the selectable GUI element 212-f. In one embodiment, for example, the selectable GUI element 212-1 of the hierarchical level 210-1 may be positioned adjacent to the decomposed GUI elements 212-2, 212-3, 212-4 of the different hierarchical level 210-2 when the selectable GUI element 212-1 is selected for decomposition. In one embodiment, for example, the selectable GUI element 212-1 of the hierarchical level 210-1 may be positioned adjoining with the decomposed GUI elements 212-2, 212-3, 212-4 of the different hierarchical level 210-2 when the selectable GUI element 212-1 is selected for decomposition.

In the illustrated embodiment shown in FIG. 3B, the multivariable presentation component 122 may generate the multivariable decomposition visualization 130 with an edge 304 of the selectable GUI element 212-1 in a first column 202-1 adjoining with an edge 306 for each of the decomposed GUI elements 212-2, 212-3, 212-4 in a second column 202-2 when the selectable GUI element 212-1 is selected for decomposition.

Figure 3C:
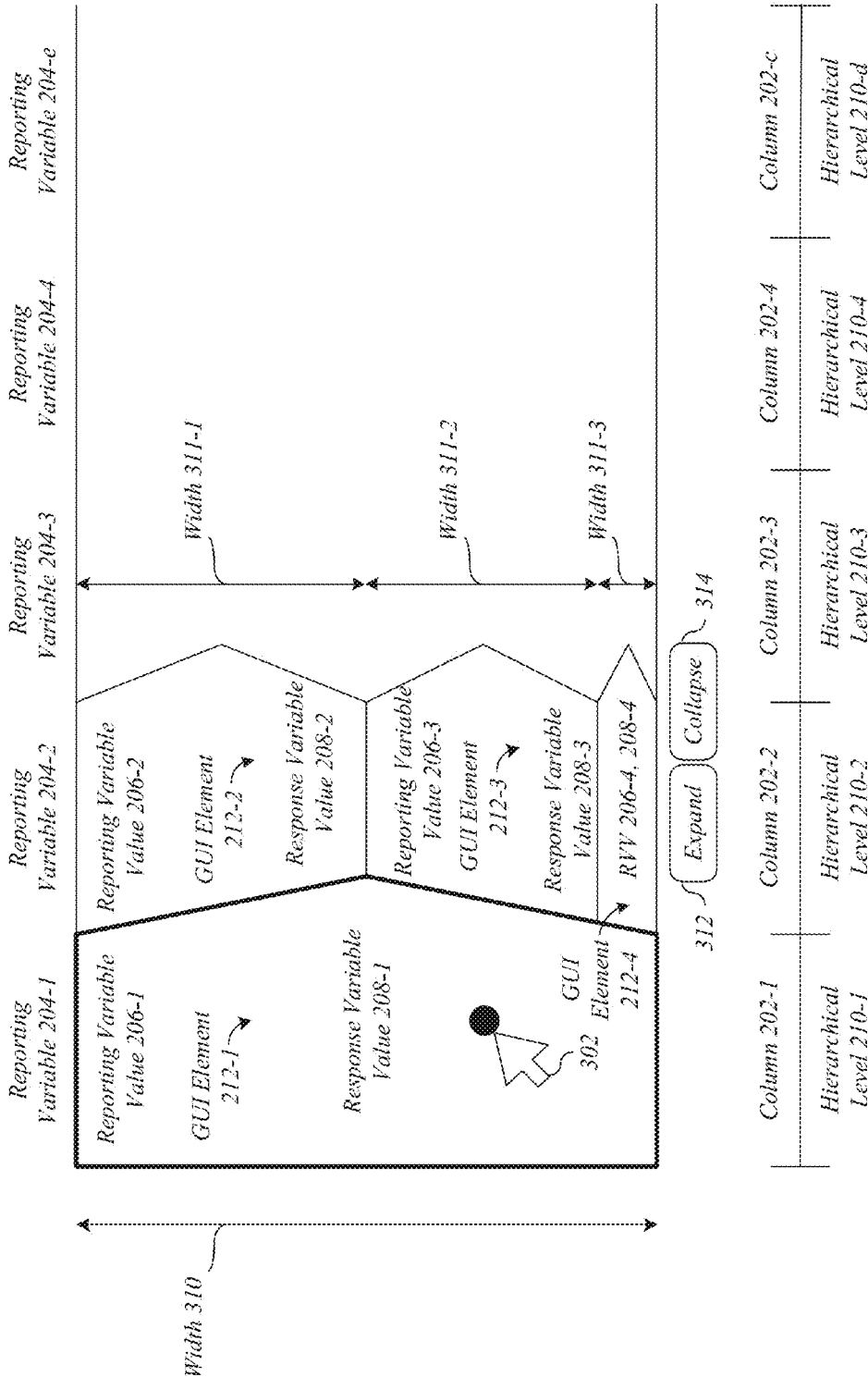
FIG. 3C illustrates an embodiment of a fourth GUI view of a hierarchical decomposition visualization.

FIG. 3C illustrates an exemplary implementation of a multivariable decomposition visualization 130 generated by the multivariable presentation component 122 and presented in a GUI view 128 generated by the user interface component 126 after decomposition with adjoining edges 304, 306 and proportional widths for the GUI elements 212-2, 212-3 and 212-4 relative to the GUI element 212-1.

As previously described, various visual attributes or properties of the GUI elements 212-f may convey information about a given set of hierarchical information 142-b. For instance, a width of a GUI element 212-f in one column 202-c may match a reporting variable value 206-g and/or a response variable value 208-h. In this manner, the user 104 may quickly assess relative values between columns 202-c based on proportional widths of GUI elements 212-f between columns 202-c.

As shown in FIG. 3C, the multivariable presentation component 122 may generate a multivariable decomposition visualization 130 with a selectable GUI element 212-1 having a width 310 proportional to an absolute value for a reporting variable 204-1 of a hierarchical level 210-1. In addition, the multivariable presentation component 122 may generate decomposed GUI elements 212-2, 212-3, 212-4 each having a width 311-1, 311-2, 311-3, respectively, proportional to an absolute value for respective reporting variable values 206-2, 206-3, 206-4 of a different reporting variable 204-2 of a different hierarchical level 210-2. The decomposed GUI elements 212-2, 212-3, 212-4 may have a total combined width 311-1, 311-2, 311-3 matching the width 310 for the selectable GUI element 212-1 when the selectable GUI element 212-1 is selected for decomposition.

By way of example, assume a response variable value 208-1 of column 202-1 comprises a value of 2537 cars. Further assume response variable values 208-2, 208-3, and 208-4 each comprises values of 1306 cars, 945 cars, and 286 cars, respectively. The widths 310, 311-1, 311-2, and 311-3 may be selected to proportionally represent these values, thereby allowing the user 104 to quickly assess a general break-down of the 2537 cars from column 202-1 in the categories of column 202-2 based solely on the widths.

Figure 3D:
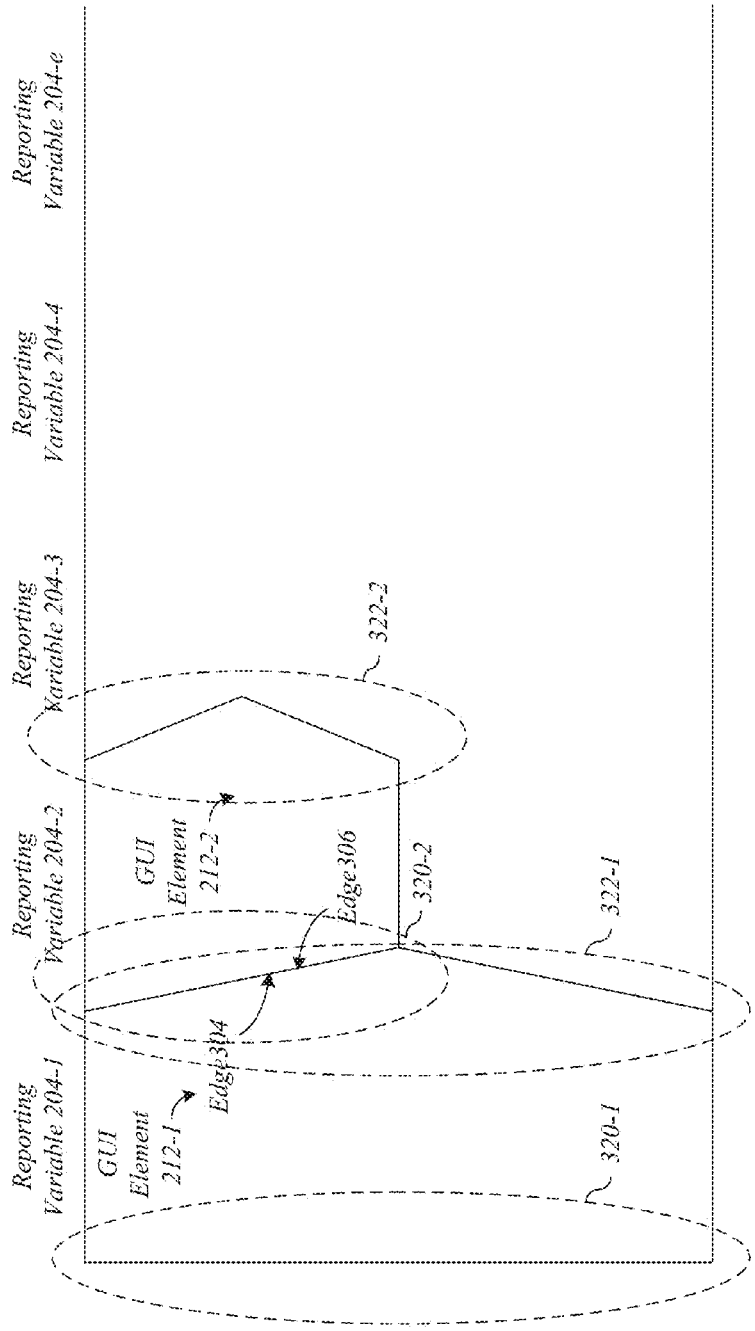
FIG. 3D illustrates an embodiment of a fifth GUI view of a hierarchical decomposition visualization.

FIG. 3D illustrates an exemplary implementation of a multivariable decomposition visualization 130 generated by the multivariable presentation component 122 and presented in a GUI view 128 generated by the user interface component 126 after decomposition with adjoining edges 304, 306 and proportional shapes for the GUI elements 212-2, 212-3 and 212-4 relative to the GUI element 212-1.

As previously described, the GUI elements 212-f may have different visual properties, such as colors, shapes, sizes or geometries depending on what type of information the GUI elements 212-f are representing. In one embodiment, the GUI elements 212-1, 212-2 may each have a general arrow shape, thereby allowing a given set of GUI elements 212-f (e.g., GUI elements 212-1, 212-2) to seamlessly transition between a given set of columns 202-c (e.g., columns 202-1, 202-2). This provides for a compact representation of the hierarchical information 142-b in a single visual graphical representation. In addition to providing an interlocking geometry, the arrow shape also provides a direction or vector for decomposed GUI elements 212-f. For example, the arrow shape indicates a direction or position where a set of decomposed GUI elements 212-f will be shown after a given GUI element 212-f has been selected. It may be appreciated, however, that other sizes, shapes, or geometries may be used for the GUI elements 212-f as desired for a given implementation. The embodiments are not limited in this context.

In the illustrated embodiment shown in FIG. 3D, the multivariable presentation component 122 may generate a multivariable decomposition visualization 130 with a selectable GUI element 212-1 having an arrow shape comprising a line end 320-1 and a pointer end 322-1. Further, the multivariable presentation component 122 may generate the multivariable decomposition visualization 130 with a decomposed GUI element 212-2 having an arrow shape comprising a line end 320-2 and a pointer end 322-2. The pointer end 322-1 of the selectable GUI element 212-1 may be positioned adjacent to, or adjoining with, a line end 320-2 for the decomposed GUI element 212-2 when the selectable GUI element 212-1 is selected for decomposition.

Figure 4:
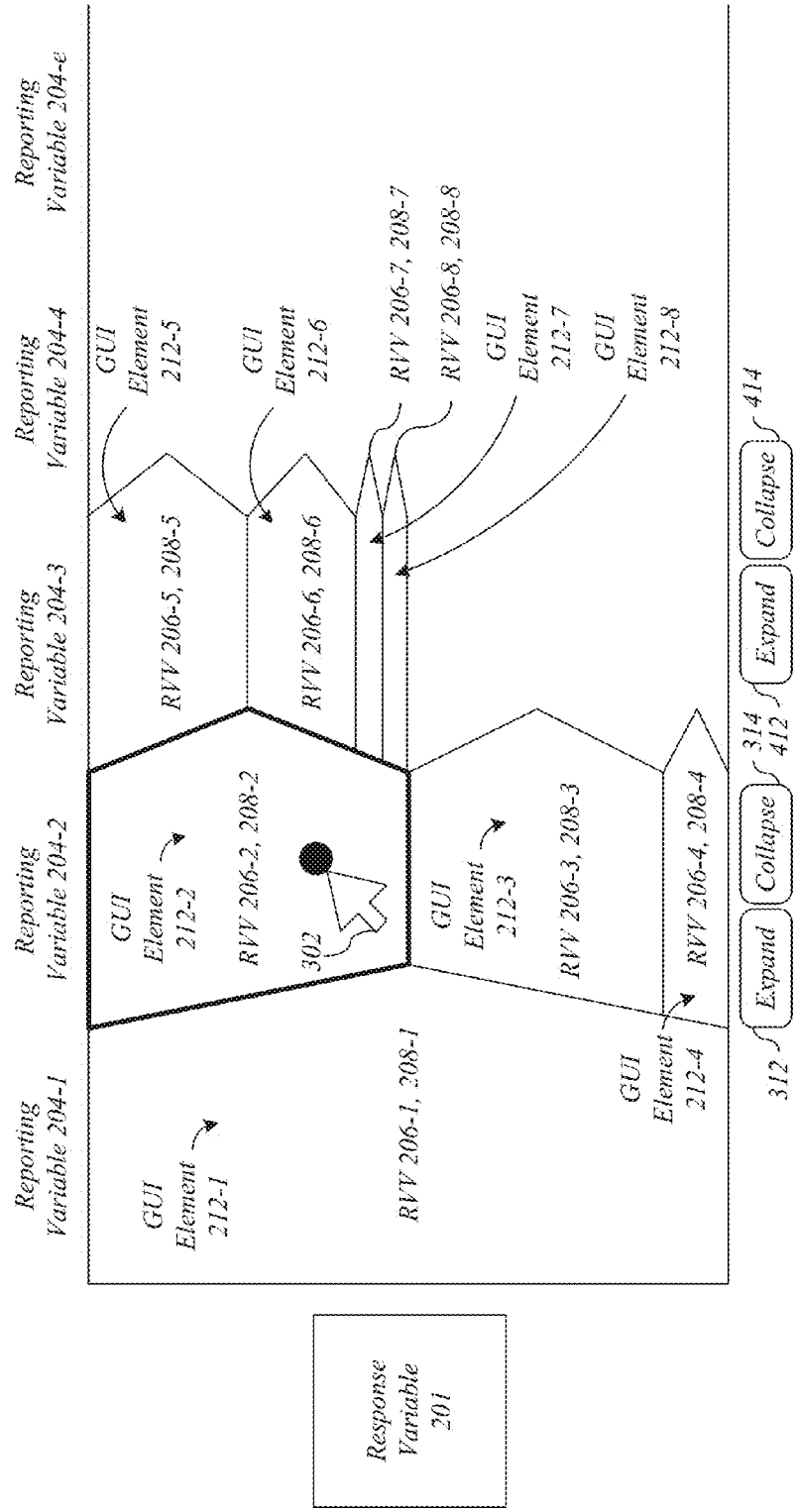
FIG. 4 illustrates an embodiment of a sixth GUI view of a hierarchical decomposition visualization.

FIG. 4 illustrates an exemplary implementation of a multivariable decomposition visualization 130 generated by the multivariable presentation component 122 and presented in a GUI view 128 generated by the user interface component 126 showing a root hierarchical level 210-1, a first decomposed hierarchical level 210-2 after a first set of decomposition operations are performed, and second decomposed hierarchical level 210-3 after a second set of decomposition operations are performed.

FIG. 4 illustrates a second level of decomposition relative to a state of the multivariable decomposition visualization 130 shown in FIGS. 3A-3D. More particularly, FIG. 4 illustrates a case where the multivariable presentation component receives a control directive 110-2 selecting a decomposed GUI element 212-2 of the set of decomposed GUI elements 212-2, 212-3, 212-4 from a second column 202-2 of a different hierarchical level 210-2 for decomposition into multiple GUI elements 212-5, 212-6, 212-7 and 212-8 of a third column 202-3 of another different hierarchical level 210-3.

In addition to showing the decomposed GUI elements 212-5, 212-6, 212-7 and 212-8 of the different hierarchical level 210-3 after selection of the GUI element 212-2, the multivariable decomposition visualization 130 may also present various GUI control elements 412, 414 for the column 202-3 of the hierarchical level 210-3. In this case, the GUI control element 412 may control expansion of the column 202-3, and the GUI control element 414 may control collapse of the column 202-3. This allows the user 104 to expand or collapse the entire column 202-3 using a single column level control, versus selecting multiple GUI elements 212-2, 212-3 and 212-4 to expose all of the GUI elements available for the column 202-3.

Figure 5:
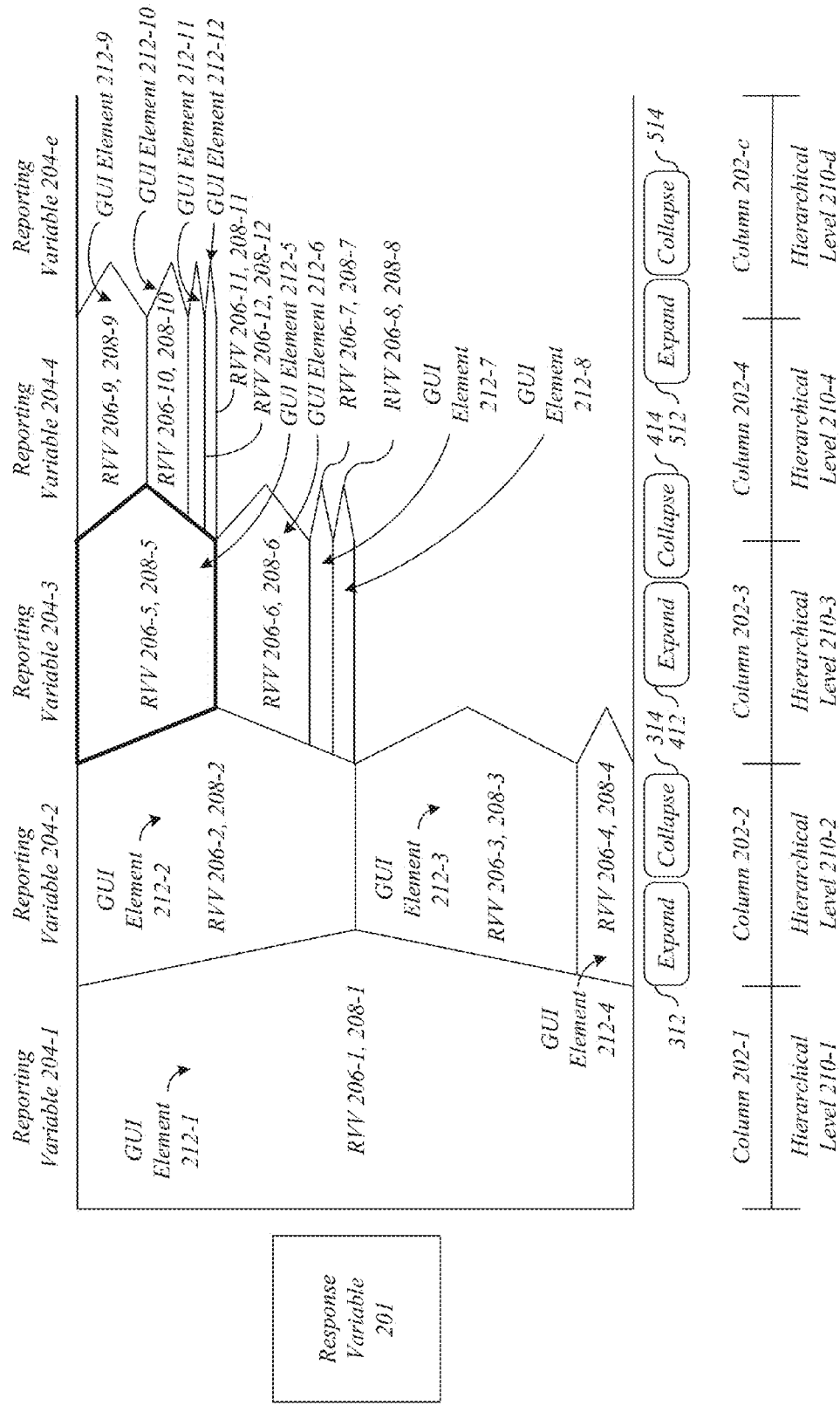
FIG. 5 illustrates an embodiment of a seventh GUI view of a hierarchical decomposition visualization.

FIG. 5 illustrates an exemplary implementation of a multivariable decomposition visualization 130 generated by the multivariable presentation component 122 and presented in a GUI view 128 generated by the user interface component 126 showing a root hierarchical level 210-1, a first decomposed hierarchical level 210-2 after a first set of decomposition operations are performed, a second decomposed hierarchical level 210-3 after a second set of decomposition operations are performed, and a third decomposed hierarchical level 210-4 after a third set of decomposition operations are performed.

FIG. 5 illustrates a case where the multivariable presentation component receives a control directive 110-3 selecting a decomposed GUI element 212-5 of the decomposed GUI elements 212-5, 212-6, 212-7, 212-8 from a third column 202-3 of another different hierarchical level 210-3 for decomposition into multiple GUI elements 212-9, 212-10, 212-11, 212-12 of a fourth column 202-4 of yet another different hierarchical level 210-4. It may be appreciated that decomposition operations may be performed for as many hierarchical levels 210-d as available for a given set of hierarchical information 142-b. The embodiments are not limited in this context.

Figure 6A:
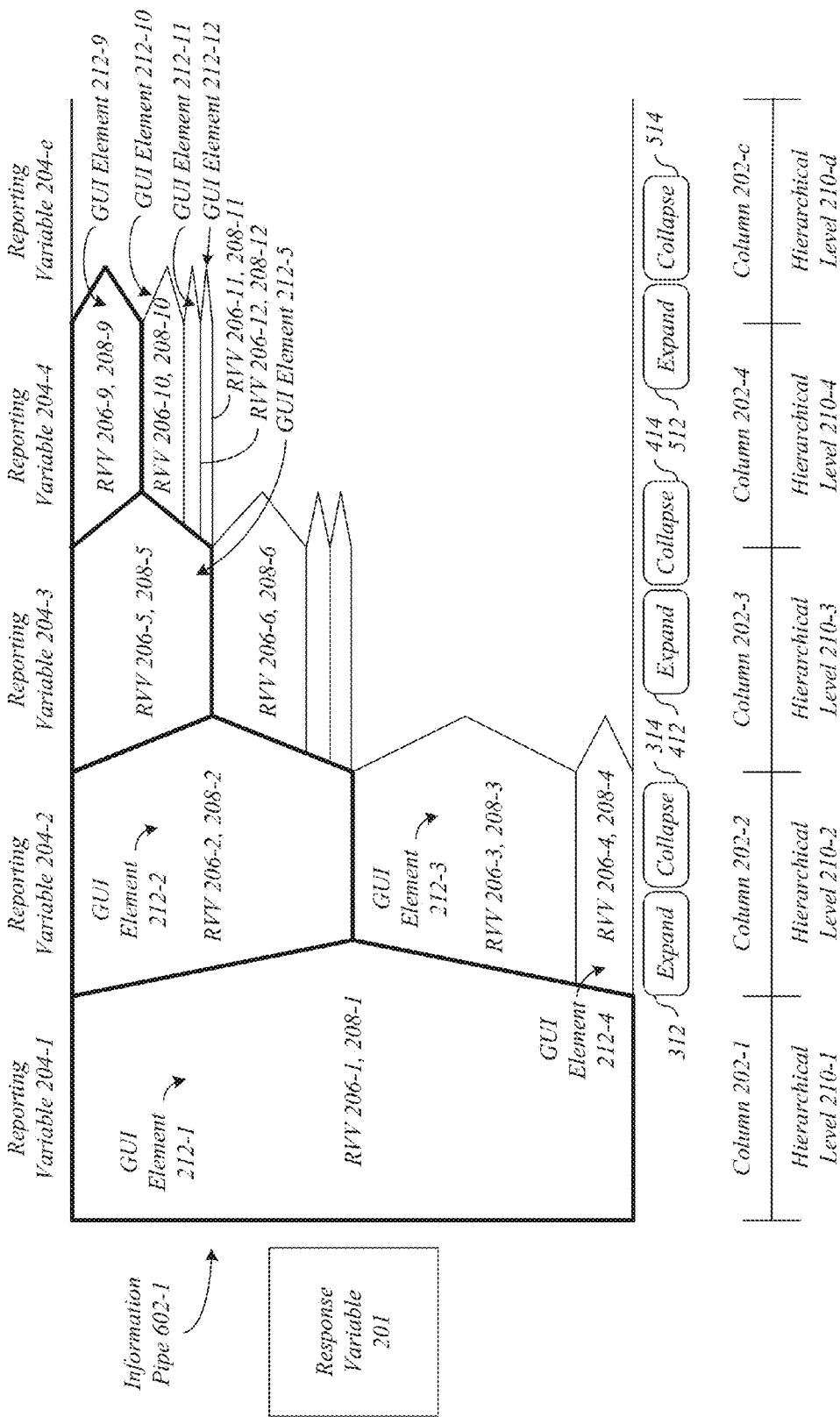
FIG. 6A illustrates an embodiment of an eighth GUI view of a hierarchical decomposition visualization.

FIG. 6A illustrates an exemplary implementation of a multivariable decomposition visualization 130 generated by the multivariable presentation component 122 and presented in a GUI view 128 generated by the user interface component 126 with a first information pipe 602-1 formed with four GUI elements 212-f after four levels of decomposition.

Once two or more levels of decomposition have been performed, alignment of GUI elements 212-f across multiple columns 202-c create an opportunity to form one or more information pipes 602-i. Each of the information pipes 602-i may represent a hierarchical path comprising multiple parent-child nodes of a given sub-tree of a tree structure represented by a given number of decomposed hierarchical levels 210-d. The formation of one or more information pipes 602-i allows the user 104 to manipulate the multivariable decomposition visualization 130 at a pipe level rather than a GUI element level or a column level.

The multivariable presentation component 122 may generate a multivariable decomposition visualization 130 with multiple columns 202-c, each column 202-c to present one or more GUI elements 212-f for each reporting variable value 206-g of a reporting variable 204-e of a given hierarchical level 210-d, with adjacent GUI elements 212-f for adjacent columns 202-c forming an information pipe 602-i representing a hierarchical path across multiple hierarchical levels 210-d.

In the illustrated embodiment shown in FIG. 6A, the multivariable presentation component 122 may generate a multivariable decomposition visualization 130 with multiple columns 202-1 to 202-4. Column 202-1 presents a GUI element 212-1. Column 202-2 presents a GUI element 212-2. Column 202-3 presents a GUI element 212-5. Column 202-4 presents a GUI element 212-9. The adjacent GUI elements 212-1, 212-2, 212-5, 212-9 for adjacent columns 202-1, 202-2, 202-3, 202-4, respectively, may collectively form an information pipe 602-1 representing a hierarchical path of a sub-tree across multiple hierarchical levels 210-1, 210-2, 210-3 and 210-4. It is worthy to note that each of the adjacent GUI elements 212-1, 212-2, 212-5, 212-9 comprises a single pipe segment of the information pipe 602-1, and when connected across adjacent columns 202-1, 202-2, 202-3, 202-4, respectively, the pipe segments collectively form the complete information pipe 602-1. The information pipe 602-1 is visually indicated in FIG. 6A with bold borders around each of the pipe segments, that is, the GUI elements 212-1, 212-2, 212-5 and 212-9.

Figure 6B:
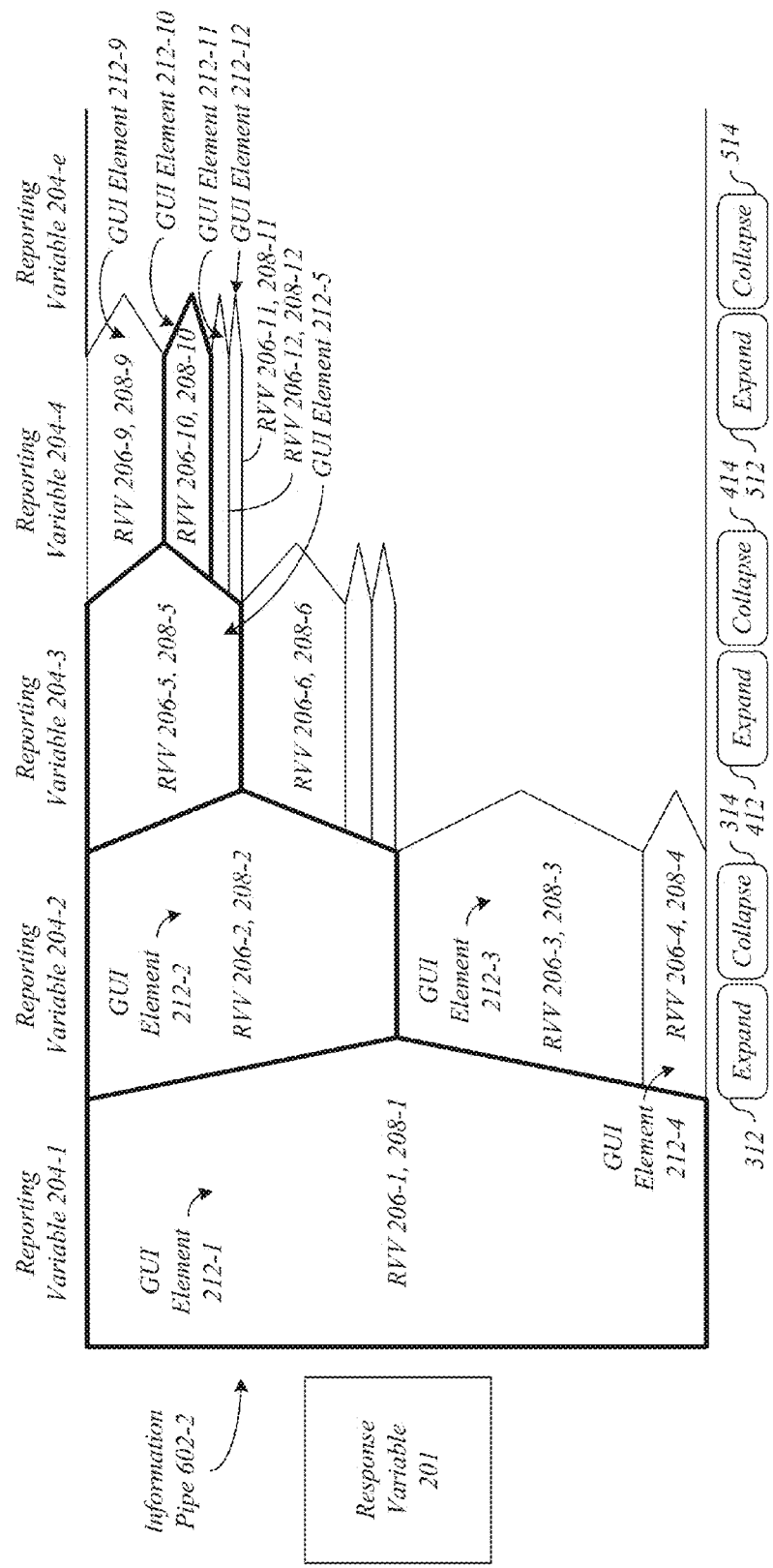
FIG. 6B illustrates an embodiment of a ninth GUI view of a hierarchical decomposition visualization.

FIG. 6B illustrates an exemplary implementation of a multivariable decomposition visualization 130 generated by the multivariable presentation component 122 and presented in a GUI view 128 generated by the user interface component 126 with a second information pipe 602-2 formed with four GUI elements 212-f after four levels of decomposition.

In the illustrated embodiment shown in FIG. 6B, the multivariable presentation component 122 may generate a multivariable decomposition visualization 130 with multiple columns 202-1 to 202-4. Column 202-1 may illustrate a GUI element 212-1. Column 202-2 may illustrate a GUI element 212-2. Column 202-3 may illustrate a GUI element 212-5. Column 202-4 may illustrate a GUI element 212-10. The adjacent GUI elements 212-1, 212-2, 212-5, 212-10 for adjacent columns 202-1, 202-2, 202-3, 202-4, respectively, may collectively form an information pipe 602-2 representing a hierarchical path across multiple hierarchical levels 210-1, 210-2, 210-3 and 210-4. The information pipe 602-2 is visually indicated in FIG. 6B with bold borders around each of the pipe segments, that is, the GUI elements 212-1, 212-2, 212-5 and 212-10.

Figure 6C:
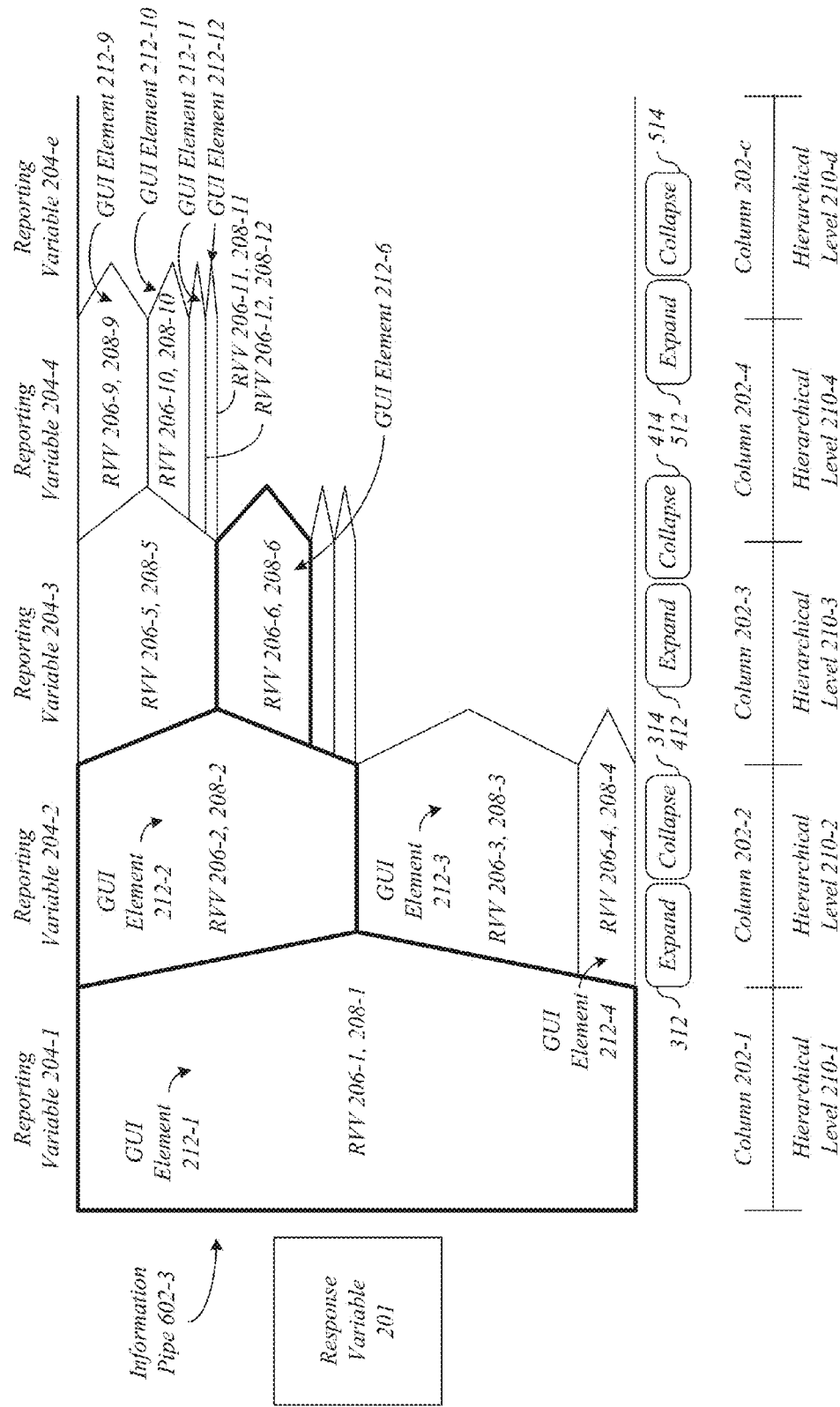
FIG. 6C illustrates an embodiment of a tenth GUI view of a hierarchical decomposition visualization.

FIG. 6C illustrates an exemplary implementation of a multivariable decomposition visualization 130 generated by the multivariable presentation component 122 and presented in a GUI view 128 generated by the user interface component 126 with a third information pipe 602-3 formed with three GUI elements 212-f after four levels of decomposition.

In the illustrated embodiment shown in FIG. 6C, the multivariable presentation component 122 may generate a multivariable decomposition visualization 130 with multiple columns 202-1 to 202-4. Column 202-1 may illustrate a GUI element 212-1. Column 202-2 may illustrate a GUI element 212-2. Column 202-3 may illustrate a GUI element 212-6. The adjacent GUI elements 212-1, 212-2, 212-6 for adjacent columns 202-1, 202-2, 202-3, respectively, may collectively form an information pipe 602-3 representing a hierarchical path across multiple hierarchical levels 210-1, 210-2, and 210-3. The information pipe 602-3 is visually indicated in FIG. 6C with bold borders around each of the pipe segments, that is, the GUI elements 212-1, 212-2, and 212-6.

It may be appreciated that any number of information pipes 602-i may be formed across any number of GUI elements 212-f for as many hierarchical levels 210-d as decomposed for a given set of hierarchical information 142-b. The embodiments are not limited in this context.

Figure 7:
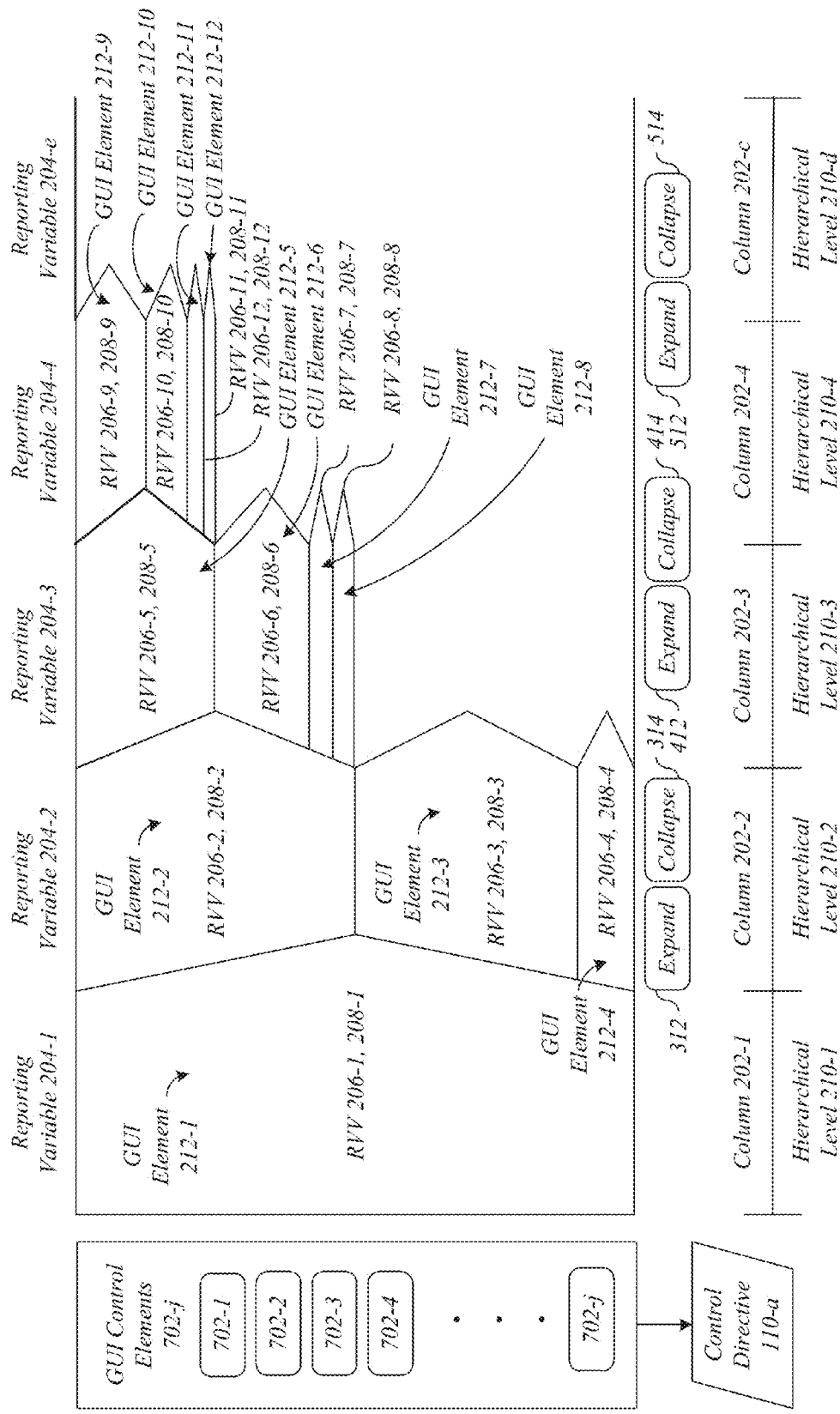
FIG. 7 illustrates an embodiment of an eleventh GUI view of a hierarchical decomposition visualization.

FIG. 7 illustrates an exemplary implementation of a multivariable decomposition visualization 130 generated by the multivariable presentation component 122 and presented in a GUI view 128 generated by the user interface component 126 with a set of GUI control elements 702-j operative to generate corresponding control directives 110-a.

In various embodiments, the multivariable presentation component 122 may generate one or more GUI control elements 702-j in a single user interface view 128 to activate one or more control directives to manipulate or navigate the multivariable decomposition visualization 130. Each of the GUI control elements 702-j may control a feature, aspect or property of a multivariable decomposition visualization 130. The user 104 may use the pointing device 302 to select a given GUI control element 702-j, and the user interface component 126 may detect the selected GUI control element 702-j and generate a corresponding control directive 110-a for delivery to the multivariable presentation component 122.

In one embodiment, for example, the multivariable presentation component 122 may receive a pipe expand control directive 110-1 when a GUI control element 702-1 is selected by the user 104. The multivariable presentation component 122 may expand one or more information pipes 602-i for the multivariable decomposition visualization 130 in response to the pipe expand control directive 110-1. The pipe expand control directive 110-1 controls visibility of different information pipes 602-i according to user commands provided by the user 104.

In one embodiment, for example, the multivariable presentation component 122 may receive a pipe collapse control directive 110-2 when a GUI control element 702-2 is selected by the user 104. The multivariable presentation component 122 may collapse one or more information pipes 602-i for the multivariable decomposition visualization 130 in response to the pipe collapse control directive 110-2. The pipe collapse control directive 110-2 may hide different information pipes 602-i according to user commands provided by the user 104.

In one embodiment, for example, the multivariable presentation component 122 may receive a load all pipes control directive 110-3 when a GUI control element 702-3 is selected by the user 104. The multivariable presentation component 122 may present all available information pipes 602-i for the multivariable decomposition visualization 130 on the user interface view 128 in response to the load all pipes control directive 110-1. The load all pipes control directive 110-3 shows all available information pipes 602-i in response to a single user command from the user 104 (e.g., one click of the pointer device 302).

In one embodiment, for example, the multivariable presentation component 122 may receive a column expand control directive 110-4 when a GUI control element 702-4 is selected by the user 104. The multivariable presentation component 122 may expand a column 202-c for the multivariable decomposition visualization 130 in response to the column expand control directive 110-4. The column expand control directive 110-4 shows all of the GUI elements 212-f (e.g., pipe segments) for a given column 202-c in response to a single user command from the user 104 (e.g., one click of the pointer device).

In one embodiment, for example, the multivariable presentation component 122 may receive a column collapse control directive 110-5 when a GUI control element 702-5 is selected by the user 104. The multivariable presentation component 122 may collapse a column 202-c for the multivariable decomposition visualization 130 in response to the column collapse control directive 110-5. The column collapse control directive 110-5 hides all of the GUI elements 212-f (e.g., pipe segments) for a given column 202-c in response to a single user command from the user 104 (e.g., one click of the pointer device).

In one embodiment, for example, the multivariable presentation component 122 may receive an aggregation control directive 110-6 when a GUI control element 702-6 is selected by the user 104. The multivariable presentation component 122 may aggregate values for a set of reporting variables 204-e for the multivariable decomposition visualization 130 in response to the aggregation control directive 110-6. The aggregation control directive 110-6 shows a sum or contribution of a particular category in the multivariable decomposition visualization 130. The aggregation control directive 110-6 may be described in more detail with reference to FIG. 8.

In one embodiment, for example, the multivariable presentation component 122 may receive a column swap control directive 110-7 when a GUI control element 702-7 is selected by the user 104. The multivariable presentation component 122 may exchange columns 202-c for the multivariable decomposition visualization 130 in response to the column swap control directive 110-7. The column swap control directive 110-8 changes an order of reporting variables 204-e. This involves re-calculating the response variable values 208-h of the GUI elements 212-f (e.g., pipe segments) for the swapped columns 202-c, and redrawing portions of the multivariable decomposition visualization 130. The column swap control directive 110-8 may be described in more detail with reference to FIGS. 9A, 9B.

In one embodiment, for example, the multivariable presentation component 122 may receive a subset control directive 110-8 when a GUI control element 702-8 is selected by the user 104. The multivariable presentation component 122 may reset an information pipe 602-i for the multivariable decomposition visualization 130 in response to the subset control directive 110-8. For instance, the subset control directive 110-8 may reset any information pipe 602-i as a new root node, which may be useful when narrowing down a particular analysis.

In one embodiment, for example, the multivariable presentation component 122 may receive a pattern finding control directive 110-9 when a GUI control element 702-9 is selected by the user 104. The multivariable presentation component 122 may modify colors for various GUI elements 212-f of an information pipe 602-i for the multivariable decomposition visualization 130 in response to the pattern finding control directive 110-9. For instance, the pattern finding control directive 110-9 may assign similar colors for information pipes 602-i having a similar response and/or similar contribution to their parents. If an information pipe 602-i has a relatively large variation in response variable values 208-h relative to its children, then more distinct colors may be used to draw the children. Otherwise, if a response variable value 208-h of each child remains the same or similar, a single color may be used.

In one embodiment, for example, the multivariable presentation component 122 may receive a pipe filter control directive 110-10 when a GUI control element 702-10 is selected by the user 104. The multivariable presentation component 122 may generate one or more reporting variables 204-e for an information pipe 602-i falling within a range of values for the multivariable decomposition visualization 130 in response to the pipe filter control directive 110-10. For instance, the pipe filter control directive 110-10 may show only the information pipes 602-i having a response variable value 208-h that falls within a defined range specified by user.

In one embodiment, for example, the multivariable presentation component 122 may receive a trace path control directive 110-11 when a GUI control element 702-11 is selected by the user 104. The multivariable presentation component 122 may highlight a hierarchical path of reporting variable values 206-g for different reporting variables 204-e for an information pipe 602-i for the multivariable decomposition visualization 130 in response to the trace path control directive 110-11. For instance, the trace path control directive 110-11 may highlight a root of a selected child pipe.

In one embodiment, for example, the multivariable presentation component 122 may receive an adaptive label control directive 110-12 when a GUI control element 702-12 is selected by the user 104. The multivariable presentation component 122 may adapt a visual characteristic of a label for an information pipe 602-i for the multivariable decomposition visualization 130 in response to the adaptive label control directive 110-12. For instance, the adaptive label control directive 110-12 may adapt labels for an information pipe 602-i in accordance with an amount of room available on the multivariable decomposition visualization 130 and/or a digital display used to present the multivariable decomposition visualization 130.

In one embodiment, for example, the multivariable presentation component 122 may receive a zoom control directive 110-13 when a GUI control element 702-13 is selected by the user 104. The multivariable presentation component 122 may enlarge or reduce an information pipe 602-i for the multivariable decomposition visualization 130 in response to the zoom control directive 110-13. For instance, the zoom control directive 110-13 may cause standard zooming operations with a mouse scroll, and panning operations with mouse-click and drag.

In one embodiment, for example, the multivariable presentation component 122 may receive a color control directive 110-14 when a GUI control element 702-14 is selected by the user 104. The multivariable presentation component 122 may select a color scheme for an information pipe 602-i for the multivariable decomposition visualization 130 in response to the color control directive 110-14. For instance, the color control directive 110-14 may select and change color schemes as per needed for an analysis. Response color shows the information pipes 602-i with a color gradient as per the value. Higher value information pipes 602-i may get darker colors, while lower value information pipes 602-i may get lighter colors. Contrasting colors may give different and distinct colors to neighboring information pipes 602-i so that individual information pipes 602-i are easier to recognize.

Figure 8:
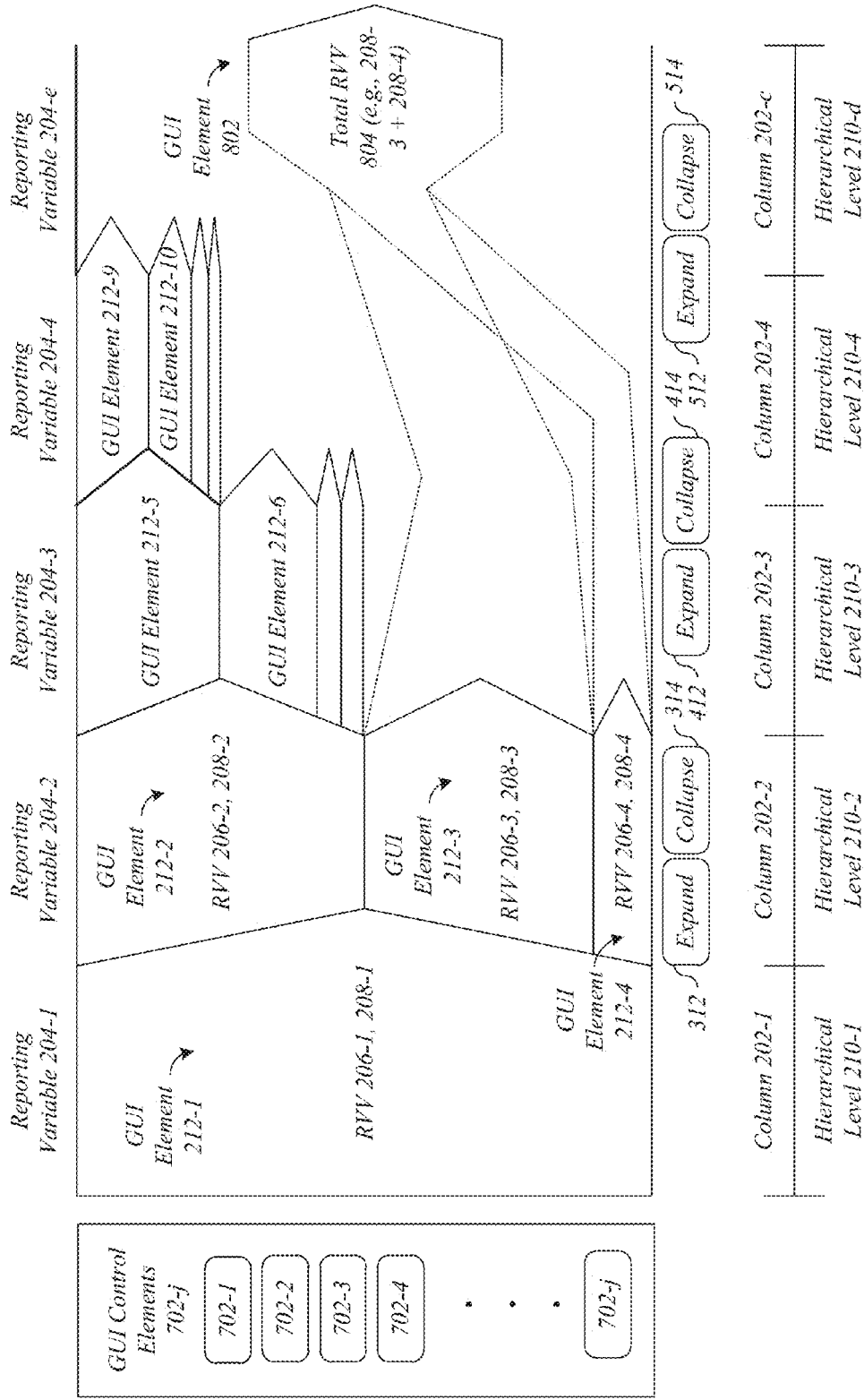
FIG. 8 illustrates an embodiment of a twelfth GUI view of a hierarchical decomposition visualization.

FIG. 8 illustrates an exemplary implementation of a multivariable decomposition visualization 130 generated by the multivariable presentation component 122 and presented in a GUI view 128 generated by the user interface component 126 with a GUI control element 702-6 to control aggregation operations.

In one embodiment, for example, the multivariable presentation component 122 may receive an aggregation control directive 110-6 when a GUI control element 702-6 is selected by the user 104. The multivariable presentation component 122 may aggregate values for a set of reporting variables 204-e for the multivariable decomposition visualization 130 in response to the aggregation control directive 110-6. The aggregation control directive 110-6 shows a sum or contribution of a particular category in the multivariable decomposition visualization 130.

By way of example, assume the user 104 would like to sum the response variable values 208-3, 208-4 of the reporting variable 204-2 as shown by the GUI elements 212-3, 212-4, respectively. In the illustrated embodiment shown in FIG. 8, lines are drawn from the GUI elements 212-3, 212-4 to a GUI element 802. The GUI element 802 may show a total response variable value 804 which is formed by adding the response variable values 208-3, 208-4. Aggregation operations can be done for any number of GUI elements 212-f from a given column 202-c.

Figure 9A:
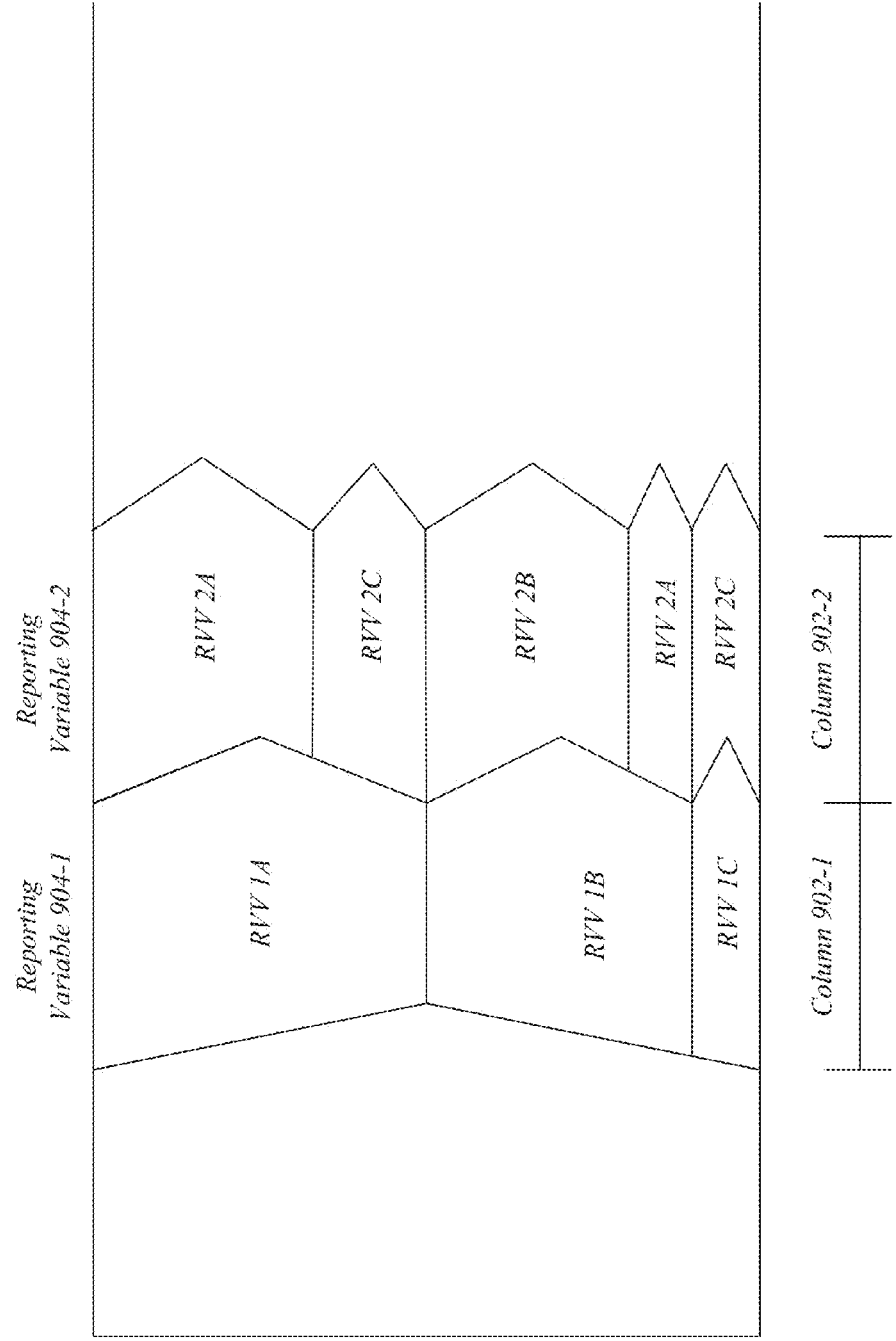
FIG. 9A illustrates an embodiment of a thirteenth GUI view of a hierarchical decomposition visualization.

FIG. 9A illustrates an exemplary implementation of a multivariable decomposition visualization 130 generated by the multivariable presentation component 122 and presented in a GUI view 128 generated by the user interface component 126 with a GUI control element 702-7 to control column swap operations before swap operations are performed.

In one embodiment, for example, the multivariable presentation component 122 may receive a column swap control directive 110-7 when a GUI control element 702-7 is selected by the user 104. The multivariable presentation component 122 may exchange columns 202-c for the multivariable decomposition visualization 130 in response to the column swap control directive 110-7. The column swap control directive 110-8 changes an order of reporting variables 204-e. This involves re-calculating the response variable values 208-h of the GUI elements 212-f (e.g., pipe segments) for the swapped columns 202-c, and redrawing portions of the multivariable decomposition visualization 130.

In the illustrated embodiment shown in FIG. 9A, a multivariable decomposition visualization 130 may comprise two columns 902-1, 902-2 corresponding with reporting variables 904-1, 904-2, respectively. The first column 902-1 may have a set of response variable values 1A, 1B and 1C for a first hierarchical level (e.g., parent nodes). The second column 902-2 may have a set of response variable values 2A, 2B and 2C for a second hierarchical level (e.g., child nodes).

By way of example, assume the reporting variable 904-1 is for a car model year (e.g., 1996, 1997, 1998), while the reporting variable 904-2 is for a car model (e.g., Ares, Apollo, Zeus). In this case, for column 902-1, the response variable value 1A for a reporting variable value of "1996" may equal 1000 cars, the response variable value 1B for a reporting variable value of "1997" may equal 900 cars, and the response variable value 1C for a reporting variable value of "1998" may equal 200 cars. For column 902-2, the response variable value 2A for a reporting variable value of "Ares" may equal 700 cars, the response variable value 2B for a reporting variable value of "Apollo" may equal 600 cars, and the response variable value 2C for a reporting variable value of "Zeus" may equal 500 cars. In accordance with the parent-child hierarchy of {car model year→car model} between columns 902-1, 902-2, the response variable value 1A of 1000 cars made in 1996 may be decomposed to 700 cars of a car model Ares (response variable value 2A) and 300 cars of a car model Zeus (response variable value 2C). Similarly, the response variable value 1B of 900 cars made in 1997 may be decomposed to 600 cars of car model Apollo (response variable value 2B) and 300 cars of car model Ares (response variable value 2A). Finally, the response variable value 1C of 200 cars made in 1998 may be decomposed into 200 cars of car model Zeus (response variable 2C).

FIG. 9B illustrates an exemplary implementation of a multivariable decomposition visualization 130 generated by the multivariable presentation component 122 and presented in a GUI view 128 generated by the user interface component 126 with a GUI control element 702-7 to control column swap operations after swap operations are performed.

Assume the user 104 would like to swap columns 902-1, 902-2 and corresponding reporting variables 904-1, 904-2, respectively. In this case, the parent-child hierarchy of {car model year→car model} is changed to {car model→car model year}. The multivariable presentation component 122 may re-calculate the response variables 1A, 1B, 1C and 2A, 2B, 2C in accordance with the parent-child hierarchy of {car model→car model year}.

In this case, for column 902-1, the response variable value 2A for a reporting variable value of "Ares" may equal 1000 cars, the response variable value 2B for a reporting variable value of "Apollo" may equal 600 cars, and the response variable value 2C for a reporting variable value of "Zeus" may equal 500 cars. For column 902-2, the response variable value 1A for a reporting variable value of "1996" may equal 1000 cars, the response variable value 1B for a reporting variable value of "1997" may equal 900 cars, and the response variable value 1C for a reporting variable value of "1998" may equal 200 cars. In accordance with the new parent-child hierarchy of {car model→car model year} between columns 902-1, 902-2, the response variable value 2A of 1000 cars of car model Ares may be decomposed to 700 cars of a car model year 1996 (response variable value 1A) and 300 cars of a car model year 1997 (response variable value 1B). Similarly, the response variable value 2B of 600 cars of a car model Apollo may be decomposed to 600 cars of car model year 1997 (response variable value 1B). Finally, the response variable value 2C of 500 cars of a car model Zeus may be decomposed into 300 cars of car model year 1998 (response variable 1C) and 200 cars of model year 1996 (response variable 1A).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein, such as the multivariable presentation component 122, for example.

In the illustrated embodiment shown in FIG. 10, the logic flow 1000 may generate a multivariable decomposition visualization to present hierarchical information for a response variable and multiple reporting variables defined for the response variable in a single user interface view, the multivariable decomposition visualization comprising multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level at block 1002. For example, as shown in FIG. 3A, the multivariable presentation component 122 may generate a multivariable decomposition visualization 130 to present hierarchical information 142-b for a response variable 201 and multiple reporting variables 204-e defined for the response variable 201 in a single user interface view 128, the multivariable decomposition visualization 130 comprising multiple GUI elements 212-f each representing a reporting variable value 206-g of multiple reporting variables 204-e for multiple hierarchical levels 210-d, with a GUI element 212-1 of a reporting variable value 206-1 of a reporting variable 204-1 of a hierarchical level 210-1 selectable for decomposition into multiple GUI elements 212-2, 212-3, 212-4 representing reporting variable values 206-2, 206-3, 206-4, respectively, of a different reporting variable 204-2 for a different hierarchical level 210-2.

The logic flow 1000 may receive a control directive indicating selection of the selectable GUI element of the hierarchical level for decomposition into decomposed GUI elements of the different hierarchical level at block 1004. For example, the multivariable presentation component 122 may receive a control directive 110-1 indicating selection of the selectable GUI element 212-1 of the hierarchical level 210-1 for decomposition into decomposed GUI elements 212-2, 212-3, 212-4 of the different hierarchical level 210-2. The hierarchical levels 210-1, 210-2 may comprise a parent-child hierarchical relationship.

The logic flow 1000 may present the selectable GUI element of the hierarchical level adjacent to the decomposed GUI elements of the different hierarchical level in response to the control directive at block 1006. For example, the multivariable presentation component 122 may present the selectable GUI element 212-1 of the hierarchical level 210-1 adjacent to the decomposed GUI elements 212-2, 212-3, 212-4 of the different hierarchical level 210-2 in response to the control directive 110-1.

Figure 11:
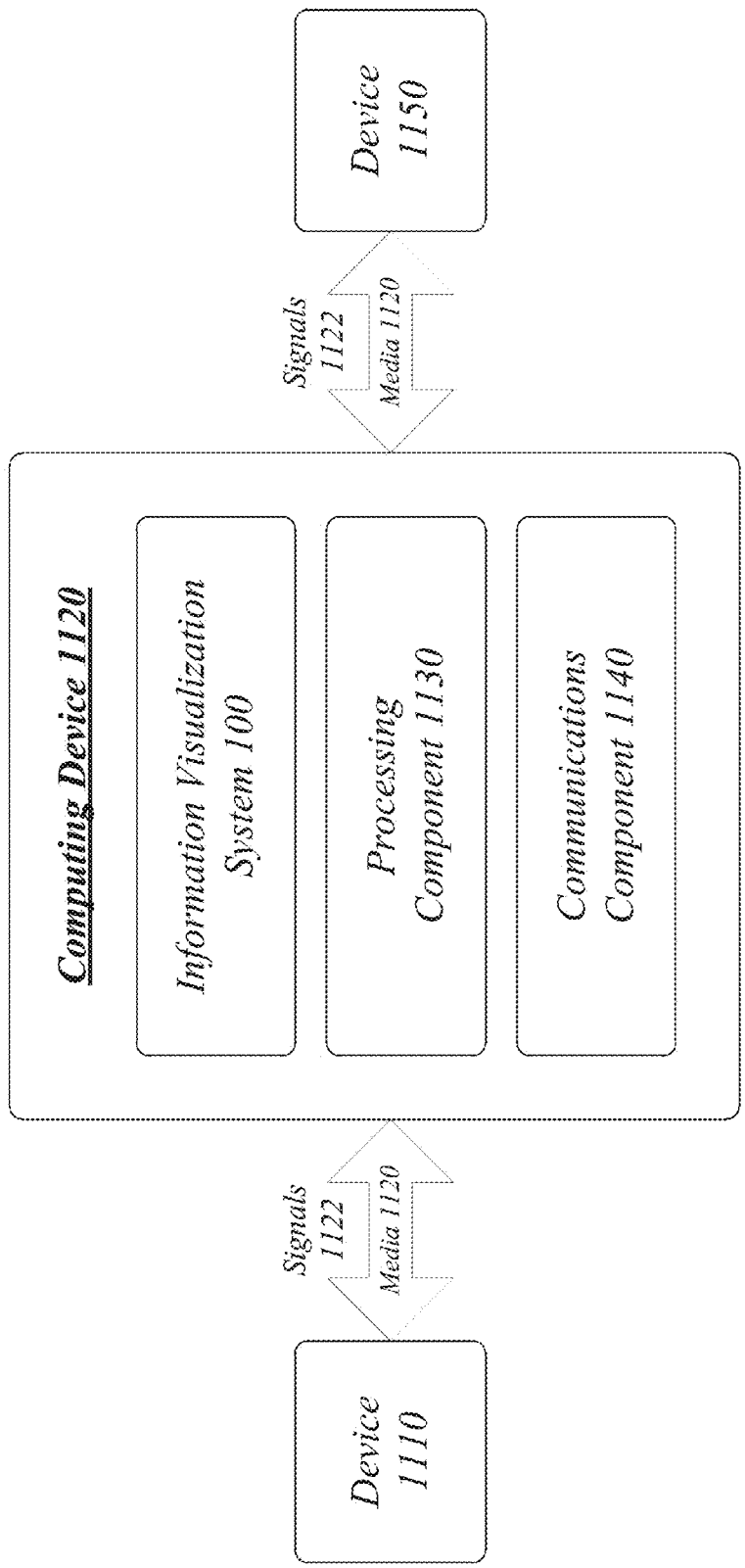
FIG. 11 illustrates an embodiment of a centralized system.

FIG. 11 illustrates a block diagram of a centralized system 1100. The centralized system 1100 may implement some or all of the structure and/or operations for the information visualization system 100 in a single computing entity, such as entirely within a single computing device 1120.

The computing device 1120 may execute processing operations or logic for the information visualization system 100 using a processing component 1130. The processing component 1130 may comprise various hardware elements, software elements, or a combination of both. Examples of hardware elements may include devices, logic devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 1120 may execute communications operations or logic for the information visualization system 100 using a communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1120 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 1120.

The computing device 1120 may communicate with other devices 1110, 1150 over a communications media 1120 using communications signals 1122 via the communications component 1140. For example, the computing device 1120 may receive hierarchical information 142-b from a remote datastore implemented by a server device 1110. In another example, a client device 1150 may access the information visualization system 100 to generate and interact with a multivariable decomposition visualization 130 via a client application, such as a web browser or client version of the information visualization system 100, for example.

Figure 12:
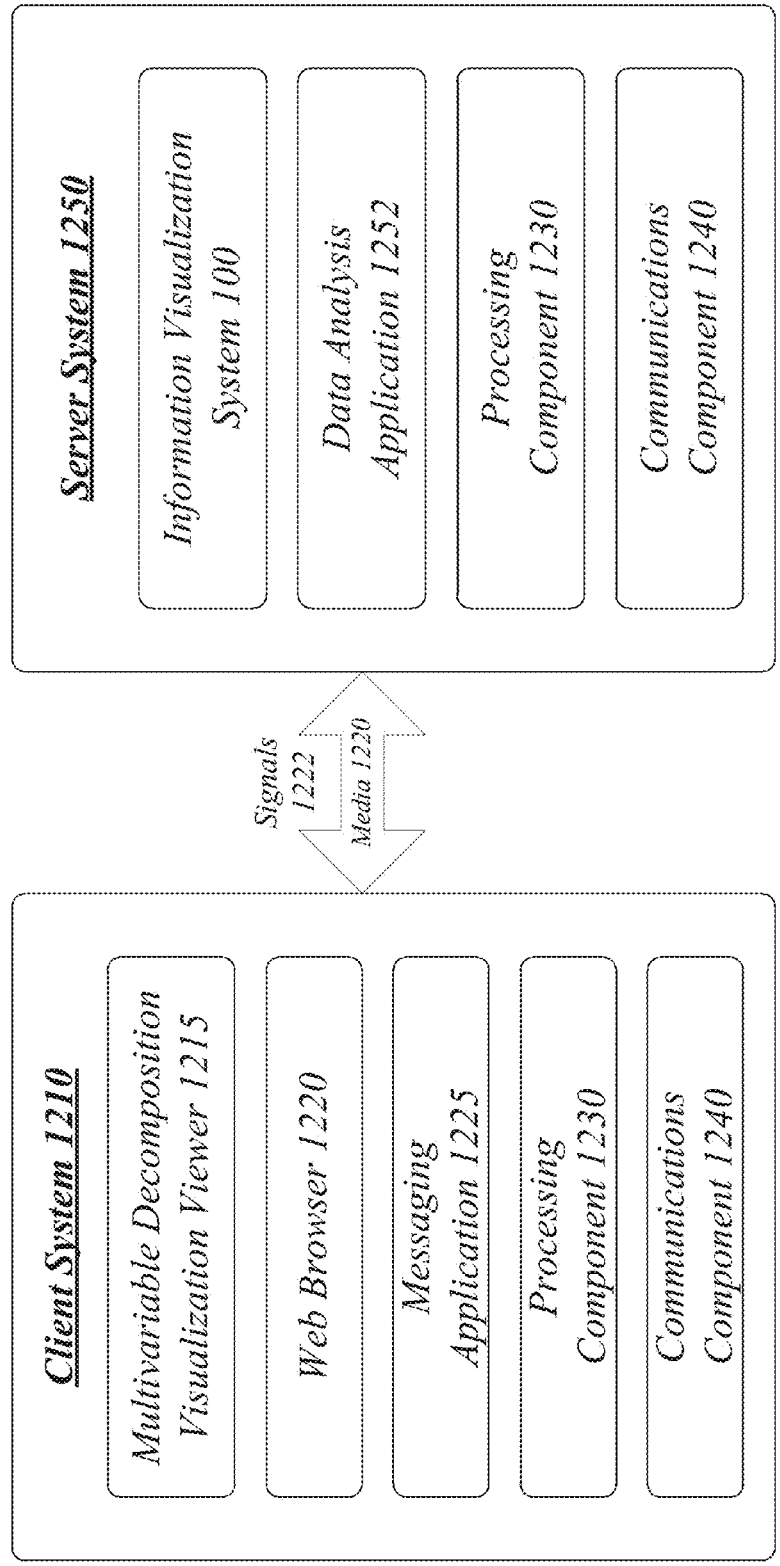
FIG. 12 illustrates an embodiment of a distributed system.

FIG. 12 illustrates a block diagram of a distributed system 1200. The distributed system 1200 may distribute portions of the structure and/or operations for the information visualization system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 1210 and the server system 1250 may process information using the processing components 1230, which are similar to the processing component 1130 described with reference to FIG. 11. The client system 1210 and the server system 1250 may communicate with each over a communications media 1220 using communications signals

1222 via communications components 1240, which are similar to the communications component 1140 described with reference to FIG. 11.

In one embodiment, for example, the distributed system 1200 may be implemented as a client-server system. A client system 1210 may implement a multivariable decomposition visualization viewer 1215, a web browser 1220, a processing component 1230 and a communications component 1240. The client system 1210 may optionally implement some or all of the information visualization system 100. A server system 1250 may implement some or all of the information visualization system 100, a data analysis application 1252, a processing component 1230 and a communications component 1240.

In various embodiments, the client system 1210 may comprise or employ one or more client computing devices and/or client programs that operate to perform various methodologies in accordance with the described embodiments. For example, the client system 1210 may implement the web browser 1220 to access the information visualization system 100 to generate a multivariable decomposition visualization 130. This may be particularly suitable for use scenarios where a set of hierarchical information 142-b is too large for processing by the client system 1210. In this case, one or more server systems 1250 may be used to process larger quantities of data for a multivariable decomposition visualization 130, and the actual multivariable decomposition visualization 130 may be presented via web technologies, such as the web browser 1220 and related techniques (e.g., web applications, web services, etc.).

Additionally or alternatively, a stand-alone companion application to the information visualization system 100 may be implemented as a client application specifically designed to interoperate with the information visualization system 100. For example, the client system 1210 may implement a multivariable decomposition visualization viewer 1215 as a thin-client application designed to send control directives 110-a as inputs to the information visualization system 100 executing on the server system 1250, and present a multivariable decomposition visualization 130 as output from the information visualization system 100.

The client system 1210 may further implement a messaging application 1225 for managing incoming and outgoing messages, such as programs for providing unified messaging (UM) for e-mail, voicemail, voice over internet protocol (VoIP), instant messaging (IM), group IM, short message service (SMS), multimedia message service (MMS), enhanced presence, and audio-video conferencing, and/or other types of programs, applications, or services in accordance with the described embodiments. The client system 1210 may use the messaging application 1225 to receive a multivariable decomposition visualization 130, or associated objects, GUI views, videos or images as message attachments, for example.

In various embodiments, the server system 1250 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 1250 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs for managing incoming and outgoing messages, messaging server programs for providing unified messaging (UM) for e-mail, voicemail, VoIP, instant messaging (IM), group IM, SMS, MMS, enhanced presence, and audio-video conferencing, and/or other types of programs, applications, or services in accordance with the described embodiments.

In various embodiments, the server system 1250 may implement some or all of the information visualization system 100. In one embodiment, for example, the server system 1250 may implement both the information visualization application 120 and the database 140 arranged to store hierarchical information 142-b. In one embodiment, for example, the server system 1250 may implement just the information visualization application 120, while the database 140 arranged to store hierarchical information 142-b is implemented in a different server or the client system 1210. In one embodiment, the server system 1250 may implement the database 140 arranged to store hierarchical information 142-b for use by the information visualization application 120 implemented on a different server. This would be advantageous when the hierarchical information 142-b requires a larger or updated datastore relative to a local datastore implemented by the client system 1210.

The server system 1250 may also implement other application programs that make use of the features provided by the information visualization system 100. For instance, the server system 1250 may implement a data analysis application 1252 suitable for performing information analytics and/or business intelligence analysis on large datasets, such as root cause analysis on enterprise datasets.

As described above, a multivariable decomposition visualization 130 provides several advantages over conventional graphical representation techniques. For instance, a multivariable decomposition visualization 130 provides a single compact graphical representation suitable for large volumes of data to be analyzed. In another example, a multivariable decomposition visualization 130 provides a single integrated view showing child analysis output and all of its ancestors. In yet another example, a multivariable decomposition visualization 130 may be manipulated via the interactive features to increase analysis output and decrease analysis time. In still another example, since the width of an information pipe 602-i is proportional to a response variable value 208-h, a total size of a parent pipe represents a 100% total value of all the values under analysis, thereby giving a multivariable decomposition visualization 130 features similar to a pie chart. In yet another example, a multivariable decomposition visualization 130 can also act as a multi-level "Pareto chart." A multivariable decomposition visualization 130 can be tuned to show a top n information pipes 602-i showing a specific percentage (%) of response variable values 208-h of its immediate parent information pipe 602-i. In still another example, a multivariable decomposition visualization 130 is highly interactive. Examples of interactions include exploration of information pipes 602-i, swapping, aggregation, column wise expand-collapse, sub-setting, pattern finding, path highlighting, filtering across levels, among others.

Figure 13:
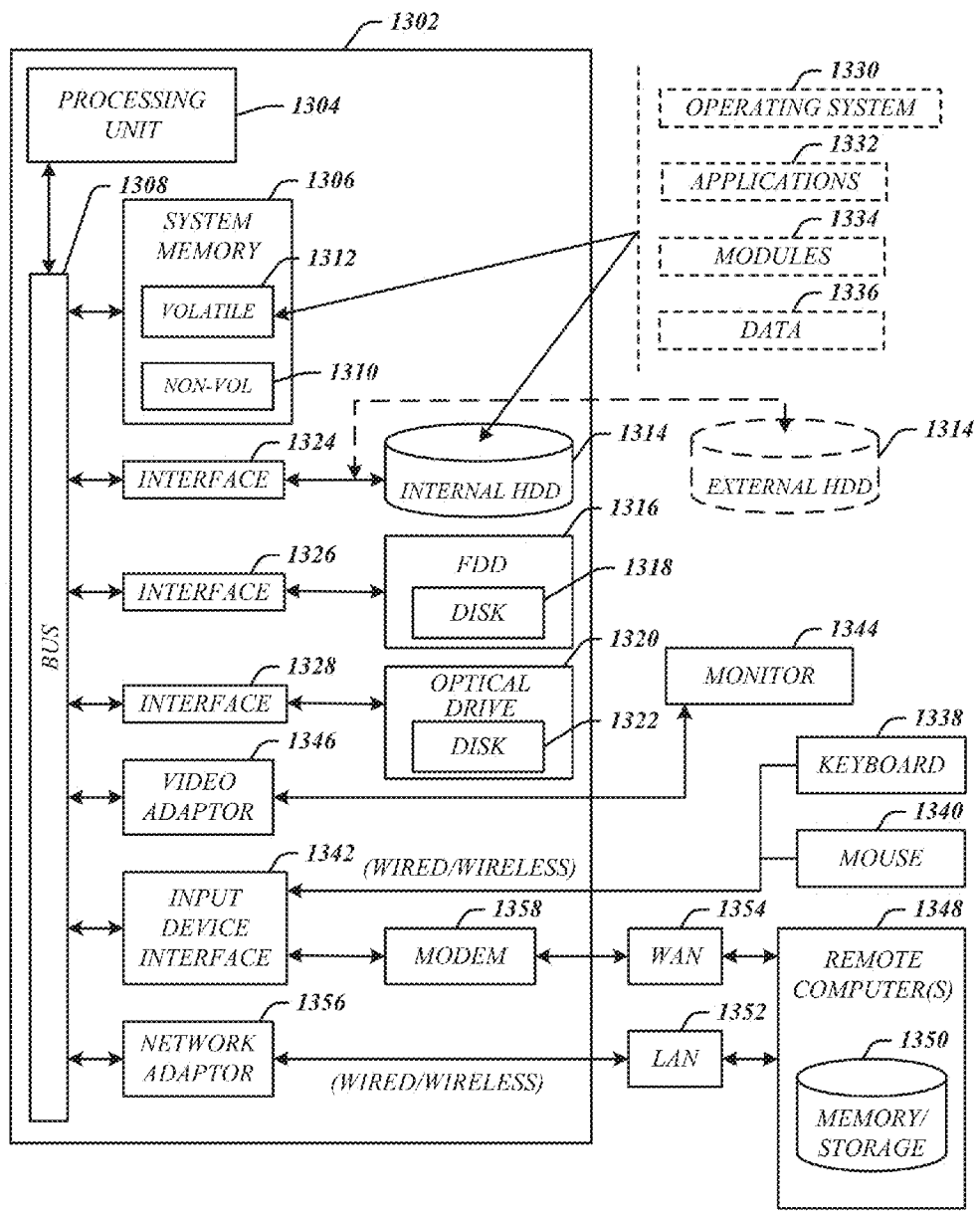
FIG. 13 illustrates an embodiment of a computing architecture.

FIG. 13 illustrates an embodiment of an exemplary computing architecture 1300 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1300 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1300 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors. Dual microprocessors and other multi-processor architectures may also be employed as the processing unit 1304. The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336.

The one or more application programs 1332, other program modules 1334, and program data 1336 can include, for example, the information visualization application 120, the multivariable presentation component 122, the hierarchical information component 124, the user interface component 126, the data analysis application 1252, and so forth.

A user can enter commands and information into the computer 1302 through one or more wire/wireless input devices, for example, a keyboard 1338 and a pointing device, such as a mouse 1340. Other input devices may include a microphone, an infra-red (IR) remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
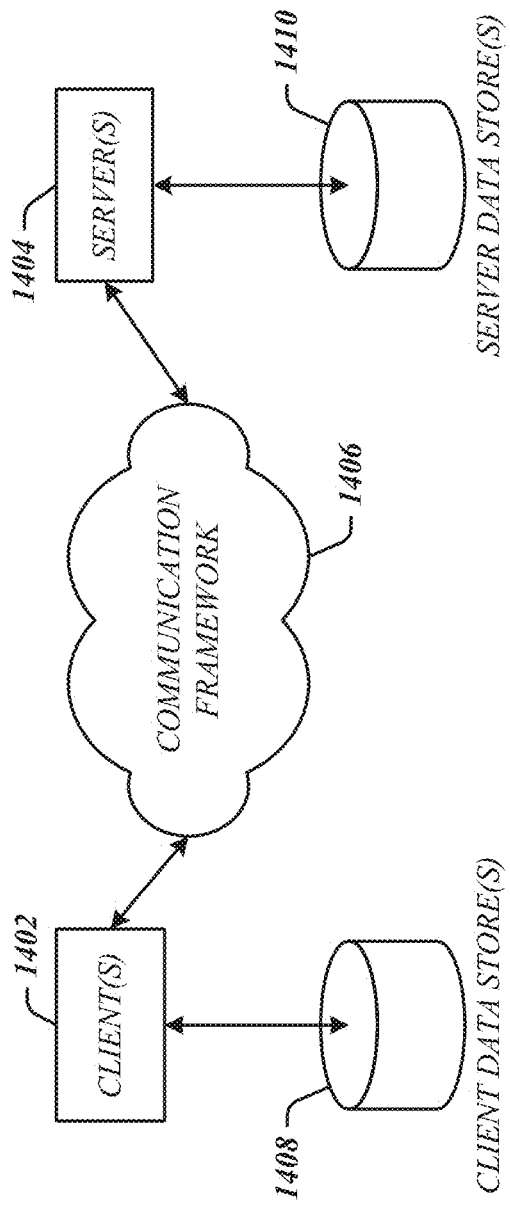
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, and so forth. The embodiments, however, are not limited to implementation by the communications architecture 1400.

As shown in FIG. 14, the communications architecture 1400 comprises includes one or more clients 1402 and servers 1404. The clients 1402 may implement the device 1110, the device 1150, the computing device 1120, or the client system 1210. The servers 1404 may implement the device 1110, the device 1150, the computing device 1120, or the server system 1250. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols, such as those described with reference to the information visualization system 100. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic device; and
an information visualization application operative on the logic device, the information visualization application comprising a multivariable presentation component arranged to generate a multivariable decomposition visualization to present hierarchical information for a response variable and multiple reporting variables defined for the response variable in a single user interface view, the multivariable decomposition visualization comprising multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level, the selectable GUI element of the hierarchical level positioned adjacent to the decomposed GUI elements of the different hierarchical level when the selectable GUI element is selected for decomposition.

2. The apparatus of claim 1, the multivariable presentation component operative to generate the multivariable decomposition visualization with multiple columns, each column to present one or more GUI elements for each reporting variable value of a reporting variable of a given hierarchical level.

3. The apparatus of claim 1, the multivariable presentation component operative to generate the multivariable decomposition visualization with each GUI element having a response variable value associated with the reporting variable value.

4. The apparatus of claim 1, the multivariable presentation component operative to receive a control directive selecting the selectable GUI element of the hierarchical level for decomposition into decomposed GUI elements of the different hierarchical level.

5. The apparatus of claim 1, the multivariable presentation component operative to generate the multivariable decomposition visualization with an edge of the selectable GUI element in a first column adjoining with an edge for each of the decomposed GUI elements in a second column when the selectable GUI element is selected for decomposition.

6. The apparatus of claim 1, the multivariable presentation component operative to generate the multivariable decomposition visualization with the selectable GUI element having a width proportional to an absolute value for the reporting variable of the hierarchical level, and the decomposed GUI elements each having a width proportional to an absolute value for a respective reporting variable value of the different reporting variable of the different hierarchical level, the decomposed GUI elements having a total combined width matching the width for the selectable GUI element when the selectable GUI element is selected for decomposition.

7. The apparatus of claim 1, the multivariable presentation component operative to generate the multivariable decomposition visualization with the selectable GUI element and the decomposed GUI elements each having an arrow shape comprising a line end and a pointer end, with a pointer end of the selectable GUI element positioned adjacent to a line end for each of the decomposed GUI elements when the selectable GUI element is selected for decomposition.

8. The apparatus of claim 1, the multivariable presentation component operative to receive a control directive selecting one of the decomposed GUI elements from a second column of the different hierarchical level for decomposition into multiple GUI elements of a third column of another different hierarchical level.

9. The apparatus of claim 1, the multivariable presentation component operative to generate the multivariable decomposition visualization with multiple columns, each column to present one or more GUI elements for each reporting variable value of a reporting variable of a given hierarchical level, with adjacent GUI elements for adjacent columns forming an information pipe representing a hierarchical path across multiple hierarchical levels.

10. The apparatus of claim 1, the multivariable presentation component operative to generate one or more GUI control elements of the single user interface view to activate one or more control directives for the multivariable decomposition visualization.

11. The apparatus of claim 1, the multivariable presentation component operative to receive a pipe expand control directive, and expand an information pipe for the multivariable decomposition visualization in response to the pipe expand control directive.

12. The apparatus of claim 1, the multivariable presentation component operative to receive a pipe collapse control directive, and collapse an information pipe for the multivariable decomposition visualization in response to the pipe collapse control directive.

13. The apparatus of claim 1, the multivariable presentation component operative to receive a load all pipes control directive, and present all available information pipes for the multivariable decomposition visualization on the user interface view in response to the load all pipes control directive.

14. The apparatus of claim 1, the multivariable presentation component operative to receive a column expand control directive, and expand a column for the multivariable decomposition visualization in response to the column expand control directive.

15. The apparatus of claim 1, the multivariable presentation component operative to receive column collapse control directive, and collapse a column for the multivariable decomposition visualization in response to the column collapse control directive.

16. The apparatus of claim 1, the multivariable presentation component operative to receive a column swap control directive, and exchange columns for the multivariable decomposition visualization in response to the column swap control directive.

17. The apparatus of claim 1, the multivariable presentation component operative to receive an aggregation control directive, and aggregate values for a set of reporting variables for the multivariable decomposition visualization in response to the aggregation control directive.

18. The apparatus of claim 1, the multivariable presentation component operative to receive a subset control directive, and reset an information pipe for the multivariable decomposition visualization in response to the subset control directive.

19. The apparatus of claim 1, the multivariable presentation component operative to receive a pattern finding control directive, and modify colors for various GUI elements of an information pipe for the multivariable decomposition visualization in response to the pattern finding control directive.

20. The apparatus of claim 1, the multivariable presentation component operative to receive a pipe filter control directive, and generate one or more reporting variables for an information pipe falling within a range of values for the multivariable decomposition visualization in response to the pipe filter control directive.

21. The apparatus of claim 1, the multivariable presentation component operative to receive a trace path control directive, and highlight a hierarchical path of reporting variable values for different reporting variables for an information pipe for the multivariable decomposition visualization in response to the trace path control directive.

22. The apparatus of claim 1, the multivariable presentation component operative to receive an adaptive label control directive, and adapt a visual characteristic of a label for an information pipe for the multivariable decomposition visualization in response to the adaptive label control directive.

23. The apparatus of claim 1, the multivariable presentation component operative to receive a zoom control directive, and enlarge or reduce an information pipe for the multivariable decomposition visualization in response to the zoom control directive.

24. The apparatus of claim 1, the multivariable presentation component operative to receive a color control directive, and select a color scheme for an information pipe for the multivariable decomposition visualization in response to the color control directive.

25. A computer-implemented method, comprising:
generating a multivariable decomposition visualization to present hierarchical information for a response variable and multiple reporting variables defined for the response variable in a single user interface view, the multivariable decomposition visualization comprising multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level;
receiving a control directive indicating selection of the selectable GUI element of the hierarchical level for decomposition into decomposed GUI elements of the different hierarchical level; and
presenting the selectable GUI element of the hierarchical level adjacent to the decomposed GUI elements of the different hierarchical level in response to the control directive.

26. The computer-implemented method of claim 25, comprising generating the multivariable decomposition visualization with multiple columns, each column to present one or more GUI elements for each reporting variable value of a reporting variable of a given hierarchical level.

27. The computer-implemented method of claim 25, comprising generating the multivariable decomposition visualization with each GUI element having a response variable value associated with the reporting variable value.

28. The computer-implemented method of claim 25, comprising generating the multivariable decomposition visualization with an edge of the selectable GUI element in a first column adjoining with an edge for each of the decomposed GUI elements in a second column when the selectable GUI element is selected for decomposition.

29. The computer-implemented method of claim 25, comprising receiving a control directive selecting one of the decomposed GUI elements from a second column of the different hierarchical level for decomposition into multiple GUI elements of a third column of another different hierarchical level.

30. The computer-implemented method of claim 25, comprising generating the multivariable decomposition visualization with multiple columns, each column to present one or more GUI elements for each reporting variable value of a reporting variable of a given hierarchical level, with adjacent GUI elements for adjacent columns forming an information pipe representing a hierarchical path across multiple hierarchical levels.

31. An article of manufacture comprising a storage medium containing instructions that when executed enable a system to:
generate a multivariable decomposition visualization to present hierarchical information for a response variable and multiple reporting variables defined for the response variable in a single user interface view, the multivariable decomposition visualization comprising multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level;
receive a control directive indicating selection of the selectable GUI element of the hierarchical level for decomposition into decomposed GUI elements of the different hierarchical level; and
present the selectable GUI element of the hierarchical level adjoining with the decomposed GUI elements of the different hierarchical level in response to the control directive.

32. The article of manufacture of claim 31, further comprising instructions that when executed enable the system to generate one or more GUI control elements of the single user interface view to activate one or more control directives for the multivariable decomposition visualization.

33. The article of manufacture of claim 31, further comprising instructions that when executed enable the system to expand an information pipe for the multivariable decomposition visualization in response to a pipe expand control directive.

34. The article of manufacture of claim 31, further comprising instructions that when executed enable the system to collapse an information pipe for the multivariable decomposition visualization in response to a pipe collapse control directive.

35. The article of manufacture of claim 31, further comprising instructions that when executed enable the system to present all available information pipes for the multivariable decomposition visualization on the user interface view in response to a load all pipes control directive.

36. The article of manufacture of claim 31, further comprising instructions that when executed enable the system to expand a column for the multivariable decomposition visualization in response to a column expand control directive.

37. The article of manufacture of claim 31, further comprising instructions that when executed enable the system to collapse a column for the multivariable decomposition visualization in response to a column collapse control directive.

38. The article of manufacture of claim 31, further comprising instructions that when executed enable the system to exchange columns for the multivariable decomposition visualization in response to a column swap control directive.

39. The article of manufacture of claim 31, further comprising instructions that when executed enable the system to aggregate values for a set of reporting variables for the multivariable decomposition visualization in response to an aggregation control directive.

40. The article of manufacture of claim 31, further comprising instructions that when executed enable the system to generate one or more reporting variables for an information pipe falling within a range of values for the multivariable decomposition visualization in response to a pipe filter control directive.

41. A computer program product stored on a computer readable storage medium that when executed enable a system to:
- generate a multivariable decomposition visualization to present hierarchical information for a response variable and multiple reporting variables defined for the response variable in a single user interface view, the multivariable decomposition visualization comprising multiple graphical user interface (GUI) elements each representing a reporting variable value of multiple reporting variables for multiple hierarchical levels, with a GUI element of a reporting variable value of a reporting variable of a hierarchical level selectable for decomposition into multiple GUI elements representing reporting variable values of a different reporting variable for a different hierarchical level;
- receive a control directive indicating selection of the selectable GUI element of the hierarchical level for decomposition into decomposed GUI elements of the different hierarchical level; and
- present the selectable GUI element of the hierarchical level adjoining with the decomposed GUI elements of the different hierarchical level in response to the control directive.

* * * * *

UNITED STATES PATENT AND TRADEMARK OFFICE
CERTIFICATE OF CORRECTION

| | | |
|---|---|---|
| PATENT NO. | : 8,671,364 B2 | Page 1 of 1 |
| APPLICATION NO. | : 13/245550 | |
| DATED | : March 11, 2014 | |
| INVENTOR(S) | : Vijay Kakde | |

It is certified that error appears in the above-identified patent and that said Letters Patent is hereby corrected as shown below:

In the Specification

Column 5, line 30; "a pplication" should be --application--
Column 9, line 42; "212-fare" should be --212-f are--

Signed and Sealed this
Seventeenth Day of June, 2014

Michelle K. Lee
*Deputy Director of the United States Patent and Trademark Office*